United States Patent
Jaeger et al.

(10) Patent No.: US 11,516,872 B2
(45) Date of Patent: Nov. 29, 2022

(54) BRIDGE CONFIGURATIONS TO COMMUNICATE WITH VARIOUS SITES

(71) Applicant: PayPal, Inc., San Jose, CA (US)

(72) Inventors: Thomas Jaeger, San Jose, CA (US); Douglas James Hurst, Niwot, CO (US); Anant Ganapathy, Fremont, CA (US); Luwei Zhang, San Jose, CA (US); Biju Balakrishnan Nair, Pleasanton, CA (US); Jan Rosen, San Jose, CA (US); Agampodi Thejana De Zoysa, Westford, MA (US)

(73) Assignee: PAYPAL, INC., San Jose, CA (US)

( * ) Notice: Subject to any disclaimer, the term of this patent is extended or adjusted under 35 U.S.C. 154(b) by 554 days.

(21) Appl. No.: 15/616,695

(22) Filed: Jun. 7, 2017

(65) Prior Publication Data

US 2017/0352020 A1 Dec. 7, 2017

Related U.S. Application Data

(60) Provisional application No. 62/346,954, filed on Jun. 7, 2016.

(51) Int. Cl.
| | |
|---|---|
| *G06Q 20/00* | (2012.01) |
| *H04W 76/25* | (2018.01) |
| *H04W 4/02* | (2018.01) |
| *G07F 13/02* | (2006.01) |
| *H04M 1/72403* | (2021.01) |
| *H04M 1/72457* | (2021.01) |
| *G06Q 50/06* | (2012.01) |

(52) U.S. Cl.
CPC .......... *H04W 76/25* (2018.02); *G07F 13/025* (2013.01); *H04M 1/72403* (2021.01); *H04M 1/72457* (2021.01); *H04W 4/023* (2013.01); *G06Q 50/06* (2013.01)

(58) Field of Classification Search
CPC ..... H04W 76/25; H04W 4/023; G07F 13/025; H04M 1/72403; H04M 1/72457; G06Q 50/06; G06Q 20/00
See application file for complete search history.

(56) References Cited

U.S. PATENT DOCUMENTS

| | | | | |
|---|---|---|---|---|
| 7,533,176 B2 * | 5/2009 | Freimuth | ............... | H04L 49/90 370/235 |
| 8,688,579 B1 * | 4/2014 | Ethington | .......... | G06Q 20/0425 705/42 |
| 2003/0200108 A1 * | 10/2003 | Malnoe | ................. | B67D 7/246 705/16 |

(Continued)

*Primary Examiner* — Shahid Merchant
*Assistant Examiner* — Bhavin D Shah
(74) *Attorney, Agent, or Firm* — Haynes and Boone, LLP

(57) ABSTRACT

Various systems, mediums, and methods may involve a bridge configured to communicate with a number of sites, such as fuel sites and/or restaurant sites. For example, a system may determine a mobile device is associated with a given fuel site, possibly located at the given fuel site, among a number of other fuel sites. Further, the system may determine one or more connections of the bridge that may be configured to communicate with a site component of the fuel site. As such, the system may transmit fuel data to the mobile device based on the one or more connections with the site component. Thus, the mobile device may display an indication of fuel available at the fuel site.

20 Claims, 16 Drawing Sheets

(56) References Cited

U.S. PATENT DOCUMENTS

| | | | | |
|---|---|---|---|---|
| 2004/0249911 | A1* | 12/2004 | Alkhatib | G06Q 10/109 |
| | | | | 709/223 |
| 2008/0049619 | A1* | 2/2008 | Twiss | H04L 45/04 |
| | | | | 370/236 |
| 2013/0246171 | A1* | 9/2013 | Carapelli | G06Q 20/3278 |
| | | | | 705/14.51 |
| 2015/0154709 | A1* | 6/2015 | Cook | G06Q 30/0281 |
| | | | | 705/4 |
| 2015/0324936 | A1* | 11/2015 | Wilson | G06Q 50/12 |
| | | | | 705/15 |
| 2016/0155109 | A1* | 6/2016 | Tang | G07F 13/025 |
| | | | | 705/71 |
| 2017/0104725 | A1* | 4/2017 | Acharya | H04L 67/148 |
| 2017/0109722 | A1* | 4/2017 | Morris | G06Q 50/06 |

* cited by examiner

BRIDGE CONFIGURATIONS TO COMMUNICATE WITH VARIOUS SITES

CROSS-REFERENCE TO RELATED APPLICATIONS

This application claims priority to U.S. Provisional Application No. 62/346,954, filed on Jun. 7, 2016, which is incorporated herein by reference in its entirety.

BACKGROUND

This disclosure generally relates to computer technology in the realm of computer networks, particularly involving network infrastructures, data structures, and multi-computer data transfer. Various activities of modern life may involve a number of technological inefficiencies. For example, various interactions are performed between technologies such as fuel pumps, card readers, and funding instruments (such as credit cards) to refuel a car. Similarly, restaurants incorporate a variety of technologies such as card readers that interact with funding instruments. Moreover, restaurant seating and orders may also be managed using electronic technologies. Such technologies may cause a number of delays and multiple steps that require actions by the user and/or other staff, exemplifying the technological inefficiencies with simply refueling or getting food at a restaurant.

As demonstrated in the example scenarios above, there may be a number of inefficiencies involved with common activities that occur every day. As described herein, there is much need for technological advancements in various aspects of computer technology in the realm of computer networks and particularly with network infrastructures described herein.

Figure 1:
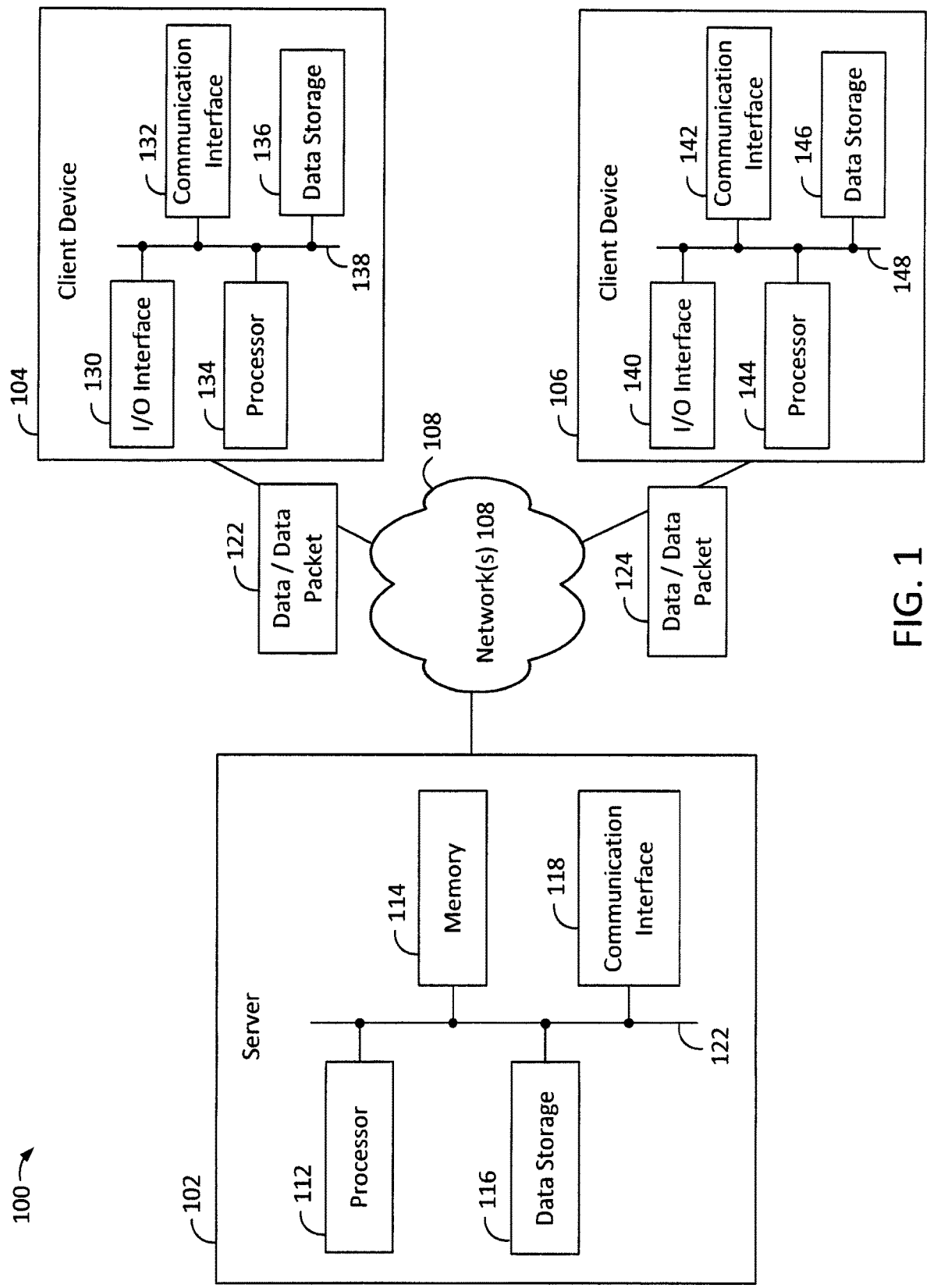
FIG. 1 is a block diagram of an exemplary system, according to an example.

Examples of the present disclosure and their advantages may be understood by referring to the detailed description herein. It should be appreciated that reference numerals may be used to illustrate various elements and features provided in the figures. The figures may illustrate various examples for purposes of illustration and explanation related to the examples of the present disclosure and not for purposes of any limitation.

DETAILED DESCRIPTION

As described above, there may be a number inefficiencies associated with common activities such as, for example, getting gas for a car, getting seated at a restaurant, and/or ordering food at the restaurant, among other activities contemplated herein. Yet, such inefficiencies described above should not be interpreted as being limited to any such activities, as additional activities and/or events may also be contemplated as well, such as in the retail space, grocery sites, and/or online web-based activities. Under various such circumstances, the examples described herein may resolve various inefficiencies related to numerous activities and/or events.

In some examples, a system described herein may be configured to alleviate the technological inefficiencies contemplated above. For example, the system may provide efficient networked data transfer techniques and data structures to enable the user described in the gas station scenario to pay for the fuel to fill up her car using a mobile device and without having to insert a funding instrument (e.g., the credit card) in to a card reader device. In addition, the system may provide efficient networked data transfer techniques and data structures enable the user to pay for her meal at the restaurant without having to use a funding instrument with a card reader device at the restaurant. That is, these techniques improve the functioning of computing systems by allowing efficient interoperation of the computing systems over a network to perform actions that were previously unable to be performed by conventional computing systems.

In some examples, the system may include a bridge configured to communicate with a number of sites. For example, the bridge may be configured to communicate with existing hardware positioned at the sites. Considering the fuel site described above, the bridge may have one or more connections with an existing site component, such as a commander box, at the fuel site. In some instances, the site component may send messages over the one or more connections that indicate information (e.g., fuel information) associated with the fuel site. As such, the bridge may transform the messages to identify, read, and/or process the information associated with the fuel site. Further, the system may transmit fuel data to a mobile device, e.g., the user's smartphone, such that the mobile device and/or a mobile application of the device displays an indication of the fuel available at the fuel site. In some instances, the mobile device may poll for the fuel data in response to a request for the data. Further, it should be noted that the site components described herein may also be referred to as controllers, site controllers, commander boxes, and/or appliances or appliance boxes, among various other types of hardware configured to carry out fuel and/or Pay-at-a-Table (PaaT) transactions.

In some examples, message transformations include converting the messages from a format used by one computing system to another message format that is used by another computing system, such that the computing systems may interoperate. For example, a fuel adapter may modify a message from a JavaScript Object Notation (JSON) message to an internal data transfer object (DTO) class that is structured to store information in a different format and that carries information between processes. For example, a DTO class may be structured as follows:

```
DeliveryResultDTO
{
    "SiteId": "123",
    "CorrelationId": "33h12",
    "Success": true,
    "ResponseMessage": "200 Success"
}
```

In such instances, the user may view the various types of available fuel displayed by the mobile device. The user may also view the various fuel types available at a given fuel pump (e.g., regular, plus, and/or premium) and the cost of each type of fuel. Further, the user may view a number of car wash options, snack items, and/or other refreshment items, among other items available at the fuel site.

In practice, the user may select a given fuel type with the mobile device. As such, the system may receive the selection and transmit instructions over the bridge to the site component to enable the fuel pump to provide the fuel type selected. Further, the system may send fuel data to the mobile device, causing the mobile device to display an indication that the fuel is ready to be pumped. In some instances, the fuel site may have an attendant and/or a robotic arm that inserts a fuel nozzle into the user's car such that the car may be refueled without the user having to exit the car. Once the nozzle has completed pumping the fuel, the user may receive a digital receipt on the mobile device. As demonstrated in this scenario, the user may fill up a tank of gas in her car, possibly without ever having to exit the vehicle.

In addition, the consumer may be prompted for other pieces of information to complete a fuel purchase, such as a prompt to purchase a carwash, a prompt to enter a loyalty card number that may be a phone number, and/or a notification prompt, such as, "Do you want a receipt to print?" In various circumstances, these prompts and/or selections may be preferences presented to the user on their mobile device and/or stored as a preference for a particular consumer.

As contemplated above, the bridge may also be configured to communicate with the restaurant sites. For example, considering the restaurant scenario described above, the bridge may have one or more connections with the restaurant the user visits. In some instances, the restaurant may send messages over the one or more connections that indicate information associated with the restaurant, particularly with the user's check once the user finishes her meal. As such, the bridge may transform the messages to identify, read, and/or process the user's check at the restaurant. Further, the system may transmit data to the user's mobile device, e.g., the user's smartphone, such that the mobile device displays the check associated with the user's meal. As demonstrated in this scenario, the user may Pay-at-a-Table (PaaT) without having to wait for the waiter to bring a check over to the user, possibly such that the user may provide a tip, and without having to provide a credit card, followed by additional delays contemplated above. As demonstrated in this scenario, the user interactions with the waiter may be minimized and/or possibly eliminated accordingly.

As demonstrated, the bridge may be configured to communicate with a number of sites, such as the gas station that the user visits to fill up her car. Further, the bridge may also be configured to communicate with a number of restaurant sites, such as the restaurant where the user visits to get her meal. As such, the bridge may be adaptable to communicate with existing sites, such as legacy fuel sites and/or restaurants contemplated above. As such, the bridge may be implemented with such existing sites without requiring the implementation of additional hardware and/or software at the sites. Thus, the systems described herein may be implemented with various sites, ranging from legacy sites to more modern sites, thereby minimizing implementation challenges, e.g., time to market and related costs.

Notably, the bridge may be configured to determine user intentions to interact with particular sites, such as the fuel sites and/or the restaurant sites described above, among various other sites including merchant sites, brick and mortar sites, retail sites, fast casual sites, fast food sites, and/or any other sites involving one or more transactions. For example, the user's intent at the fuel site may be to obtain gas for her car. Yet, the user's intent at the restaurant site may be to get food and drinks. In such instances, the user's intent to pay is determined based on analysis of electronic communications between the user's mobile device and the various sites. As such, the bridge is configured to analyze interactions between electronic devices in a networked computing system to the user's intent to pay with her smartphone device and deliver an indication of that intent back to the various sites for purposes of interacting with the various sites (e.g., the site components, the point-of-sale (POS) devices, the merchant devices, etc.)

Particular sequences are described herein, which may be used to implement examples of the claimed invention and provide specific rules for multicomputer data transfer. The particular sequences described for multicomputer data transfer improve the functioning of the network and its components by providing efficient techniques for performing the multicomputer data transfer. Moreover, these techniques solve problems relating to accurately communicating messages and events between the various networked components described herein. That is, the particular sequences improve the functioning of the multi-computer network and of the computers in the network.

A system of one or more computers can perform particular operations or actions by virtue of having software, firmware, hardware, or a combination of such components installed on the system that in operation causes or cause the system to perform the actions. One or more computer programs can perform particular operations or actions by virtue of including instructions that, when executed by data processing apparatus, cause the apparatus to perform the actions. One general aspect includes a system, including: a non-transitory memory; and one or more hardware processors coupled to the non-transitory memory and configured to read instructions from the non-transitory memory to cause the system to perform operations including determining a bridge configured to communicate with a plurality of fuel sites; determining a mobile device associated with a fuel site from the plurality of fuel sites, where the fuel site includes a site component; determining one or more connections of the bridge with the site component of the fuel site; and transmitting fuel data to the mobile device based at least on the one or more connections of the bridge with the site component, where the mobile device displays an indication of fuel available at the fuel site based at least on the fuel data transmitted. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause a machine to perform operations including determining a bridge including a plurality of adapters, where the plurality of adapters correspond to a plurality of fuel sites. The machine-readable instructions are further executable to cause a machine to perform operations including determining a mobile device associated with a fuel site from the plurality of fuel sites, where the fuel site includes a site component. The machine-readable instructions are further executable to cause a machine to perform operations including transforming one or more messages from at least one adapter from the plurality of adapters, where the one or more messages is received from the site component. The machine-readable instructions are further executable to cause a machine to perform operations including transmitting fuel data to the mobile device based at least on the one or more transformed messages, where the mobile device displays an indication of fuel available at the fuel site based at least on the fuel data transmitted. Other examples of this aspect include corresponding computer systems, apparatus, and computer programs recorded on one or more computer storage devices, each to perform the actions of the methods.

One general aspect includes a method including: determining one or more requests from a mobile device associated with a given site. The method also includes determining a bridge configured to communicate with the given site. The method also includes causing the bridge to transform one or more messages from at least one adapter associated with the given site. The method also includes transmitting data to the mobile device based at least on the one or more transformed messages, where the mobile device displays an indication of one or more items available at the given site based at least on the data transmitted. Other examples of this aspect include corresponding computer systems, apparatus, and computer programs recorded on one or more computer storage devices, each to perform the actions of the methods.

FIG. 1 is a simplified block diagram of an exemplary system 100, according to an example. As shown, the system 100 may include a server 102. The server 102 may be configured to perform operations of a provider, such as PayPal, Inc. of San Jose, Calif., USA. Further, the system 100 may also include client device 104 and the client device 106. As such, the server 102 and the client devices 104 and 106 may be configured to communicate over the one or more communication networks 108. As shown, the system 100 includes multiple computing devices 102, 104, and/or 106.

The system 100 may operate with more or less than the computing devices 102, 104, and/or 106 shown in FIG. 1, where each device may be configured to communicate over the one or more communication networks 108, possibly to transfer (e.g., send and/or receive) data accordingly. The one or more communication networks 108 may include a packet-switched network configured to provide digital networking communications and/or exchange data of various forms, content, type, and/or structure. In some instances, the one or more communication networks 108 may include a data network, a public network, a private network, a local area network, a wide area network, a telecommunications network, and/or a cellular network, among other possible networks. In some instances, the communication network 108 may include network nodes, web servers, switches, routers, base stations, microcells, and/or various buffers/queues to transfer data/data packets 122 and/or 124.

The data/data packets 122 and/or 124 may include the various forms of data associated with the user accounts and/or various sites described herein. The data/data packets 122 and/or 124 may be transferrable using communication protocols such as packet layer protocols, packet ensemble layer protocols, and/or network layer protocols, among other types of communication protocols. For example, the data/data packets 122 and/or 124 may be transferrable using transmission control protocols and/or interne protocols (TCP/IP). In various examples, each of the data/data packets 122 and 124 may be assembled or disassembled into larger or smaller packets of varying capacities, such as capacities varying from 1,000 to 1,100 bytes, for example, among other possible data capacities. As such, data/data packets 122 and/or 124 may be transferrable over the one or more networks 108 and to various locations in the one or more networks 108.

In some examples, the server 102 may take a variety of forms. The server 102 may be an enterprise server, possibly operable with one or more operating systems to facilitate the scalability of the architecture within the system 100. For example, the server 102 may operate with a Unix-based operating system configured to integrate with a growing number of other servers in the one or more networks 108, the client devices 104 and/or 106, among other computing devices configured to communicate with the system 100. The server 102 may further facilitate workloads associated with numerous data transfers in view of an increasing number of applications on the client devices 104 and/or 106. In particular, the server 102 may facilitate the scalability relative to an increasing number of data transfers to eliminate data congestion, bottlenecks, and/or delays associated with such data transfers.

In some examples, the server 102 may include multiple components, such as one or more hardware processors 112, non-transitory memories 114, non-transitory data storages 116, and/or communication interfaces 118, among other possible components described in relation to FIG. 1, any of which may be communicatively linked via a system bus, network, or other connection mechanism. The one or more hardware processors 112 may take the form of a multi-purpose processor, a microprocessor, a special purpose processor, a digital signal processor (DSP) and/or other types of processing components. For example, the one or more hardware processors 112 may include an application specific integrated circuit (ASIC), a programmable system-on-chip (SOC), and/or a field-programmable gate array (FPGA). In particular, the one or more hardware processors 112 may include a variable-bit (e.g., 64-bit) processor architecture configured to transfer (e.g., send and/or receive) the data packets 122 and/or 124. As such, the one or more hardware processors 112 may execute varying instructions sets (e.g., simplified and complex instructions sets) with fewer cycles per instruction than other general-purpose hardware processors, thereby improving the performance of the server 102.

In practice, for example, the one or more hardware processors 112 may be configured to read instructions from the non-transitory memory component 114 to cause the system 100 to perform operations. For example, the system 100 may determine a bridge configured to communicate with a number of fuel sites described above. Further, the system 100 may determine the mobile device 104 is associated with a given fuel site from the number of fuel sites.

As noted, the fuel site may include a site component. Yet further, the system 100 may determine one or more connections of the bridge with the site component of the fuel site. In addition, the system 100 may transmit fuel data to the mobile device 104 based on the one or more connections of the bridge with the site component. As such, the mobile device 104 may display an indication of fuel available at the fuel site based on the fuel data transmitted.

The non-transitory memory component 114 and/or the non-transitory data storage 116 may include one or more volatile, non-volatile, and/or replaceable storage components, such as magnetic, optical, and/or flash storage that may be integrated in whole or in part with the one or more hardware processors 112. Further, the memory component 114 may include or take the form of a non-transitory computer-readable storage medium, having stored thereon computer-readable instructions that, when executed by the hardware processing component 112, cause the server 102 to perform operations described in this disclosure, illustrated by the accompanying figures, and/or otherwise contemplated herein.

The communication interface component 118 may take a variety of forms and may be configured to allow the server 102 to communicate with one or more devices, such as the client devices 104 and/or 106. For example, the communication interface 118 may include a transceiver that enables the server 102 to communicate with the client devices 104 and/or 106 over the one or more communication networks 108. In some instances, the communication interface 118 may include a wired interface, such as an Ethernet interface, to communicate with the client devices 104 and/or 106. Further, in some instances, the communication interface 118 may include a cellular interface, such as a Global System for Mobile Communications (GSM) interface, a Code Division Multiple Access (CDMA) interface, and/or a Time Division Multiple Access (TDMA) interface. Yet further, in some instances, the communication interface 118 may include a wireless local area network interface, such as a WI-FI interface configured to communicate with a number of different protocols. As such, the communication interface 118 may include a wireless interface operable to transfer data over short distances utilizing short-wavelength radio waves in approximately the 2.4 to 2.485 GHz range. In some instances, the communication interface 118 may send/receive data or data packets 122 and/or 124 to/from client devices 104 and/or 106.

The client devices 104 and 106 may also be configured to perform a variety of operations such as those described in this disclosure, illustrated by the accompanying figures, and/or otherwise contemplated herein. In particular, the client devices 104 and 106 may be configured to transfer data packets 122 and/or 124 to and from the server 102. The data packets 122 and/or 124 may also include location data such as Global Positioning System (GPS) data or GPS coordinate data, triangulation data, beacon data, WI-FI data, sensor data, movement data, and/or temperature data, among other types of data.

In some examples, the client devices 104 and 106 may include or take the form of a smartphone system, a personal computer (PC) such as a laptop device, a tablet computer device, a wearable computer device, a head-mountable display (HMD) device, a smart watch device, and/or other types of computing devices configured to transfer data with the server 102. The client devices 104 and 106 may include various components, including, for example, input/output (I/O) interfaces 130 and 140, communication interfaces 132 and 142, hardware processors 134 and 144, and non-transitory data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to users of the client devices 104 and 106. For example, the I/O interface 130 may include a graphical user interface (GUI) configured to receive a user input that activates the provider application with the other applications. Thus, the I/O interfaces 130 and 140 may include displays and/or hardware with physical surfaces such as touchscreens with touch sensors and/or proximity sensors configured with variable sensitivities to detect the touch inputs by one or more users. The I/O interfaces 130 and 140 may also be synched with a microphone, sound speakers, and/or other audio mechanisms configured to receive voice commands. Further, the I/O interfaces 130 and 140 may also include a computer mouse, a keyboard, and/or other interface mechanisms. In addition, I/O interfaces 130 and 140 may include output hardware, such as one or more touchscreen displays, haptic feedback systems, and/or other hardware components.

In some examples, communication interfaces 132 and 142 may include or take a variety of forms. For example, communication interfaces 132 and 142 may be configured to allow client devices 104 and 106, respectively, to communicate with one or more devices according to a number of protocols described or contemplated herein. For instance, communication interfaces 132 and 142 may be configured to allow client devices 104 and 106, respectively, to communicate with the server 102 via the one or more communication networks 108. The processors 134 and 144 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components described or contemplated herein.

The data storages 136 and 146 may include one or more volatile, non-volatile, removable, and/or non-removable storage components, and may be integrated in whole or in part with processors 134 and 144, respectively. Further, data storages 136 and 146 may include or take the form of non-transitory computer-readable mediums, having stored thereon instructions that, when executed by processors 134 and 144, cause the client devices 104 and 106 to perform operations, respectively, such as those described in this disclosure, illustrated by the accompanying figures, and/or otherwise contemplated herein.

In some examples, the client device 104 may transfer data associated with a user account. For example, the data transferred may be encoded in the data packet 122 to establish a connection with the server 102. As such, the data packet 122 may initiate a search of an internet protocol (IP) address of the server 102 that may take the form of the IP address, "192.168.1.102," for example. In some instances, an intermediate server, e.g., a domain name server (DNS) and/or a web server, possibly in the one or more networks 108 may identify the IP address of the server 102 to establish the connection between the client device 104 and the server 102. As such, the server 102 may receive the data transferred with the data packet 122.

It can be appreciated that the server 102 and the client devices 104 and/or 106 may be deployed in various other ways. For example, the operations performed by the server 102 and/or the client devices 104 and 106 may be performed by a greater or a fewer number of devices. Further, the operations performed by two or more of the devices 102, 104, and/or 106 may be combined and performed by a single device. Yet further, the operations performed by a single device may be separated or distributed among the server 102 and the client devices 104 and/or 106. In addition, the client devices 104 and/or 106 may be operated and/or maintained by different users such that each client device 104 and/or 106 may be associated with one or more respective user accounts.

Notably, a user account associated with a provider may be displayed on the client device 104, possibly with the I/O interface 130. For example, a provider application of the client device 104 may be configured to access the user account displayed on the I/O interface 130. In some instances, the user account may be a personal account including funds. Further, the user account may be a corporate account, such that employees, staff, worker personnel, and/or contractors, among other individuals may have access to the corporate account. Further, an account may be a family account created for multiple family members, where each member may have access to the account. It should be noted that a user described herein may be an individual, a number of individuals, and/or a group. Yet further, the user may take the form of a robot, a robotic device, and/or a robotic system, among other computing devices capable of transferring data associated with the user account. In some instances, data may be required by the system 100 to access the user account and/or perform a transfer with the account. For example, the data required may include credential information, such as a login, an email address, a username, a password, a phone number, a security code, an encryption key, authentication data, biometric data (e.g., fingerprint data), and/or other types of data to access the user account and/or perform a transfer with the account.

In some examples, the client device 104 may take the form of the user's mobile device and the client device 106 may take the form of a merchant device. In some instances, the communication interface 132 of the mobile device 104 may include a near field communication (NFC) chip to wirelessly transmit the data 122 to the merchant device 106 over short ranges. Further, the communication interface 142 of the merchant device 104 may also include an NFC chip to wirelessly receive the data 122 over such short ranges. As such, a fund transfer may be completed based on such data 122 transmitted and/or received. Yet further, in some instances, the mobile device 104 and the merchant device 106 may establish a NFC connection based on the short distances between the mobile device 104 and the merchant device 106. As such, a fund transfer may be completed based on the NFC connection established.

Figure 2A:
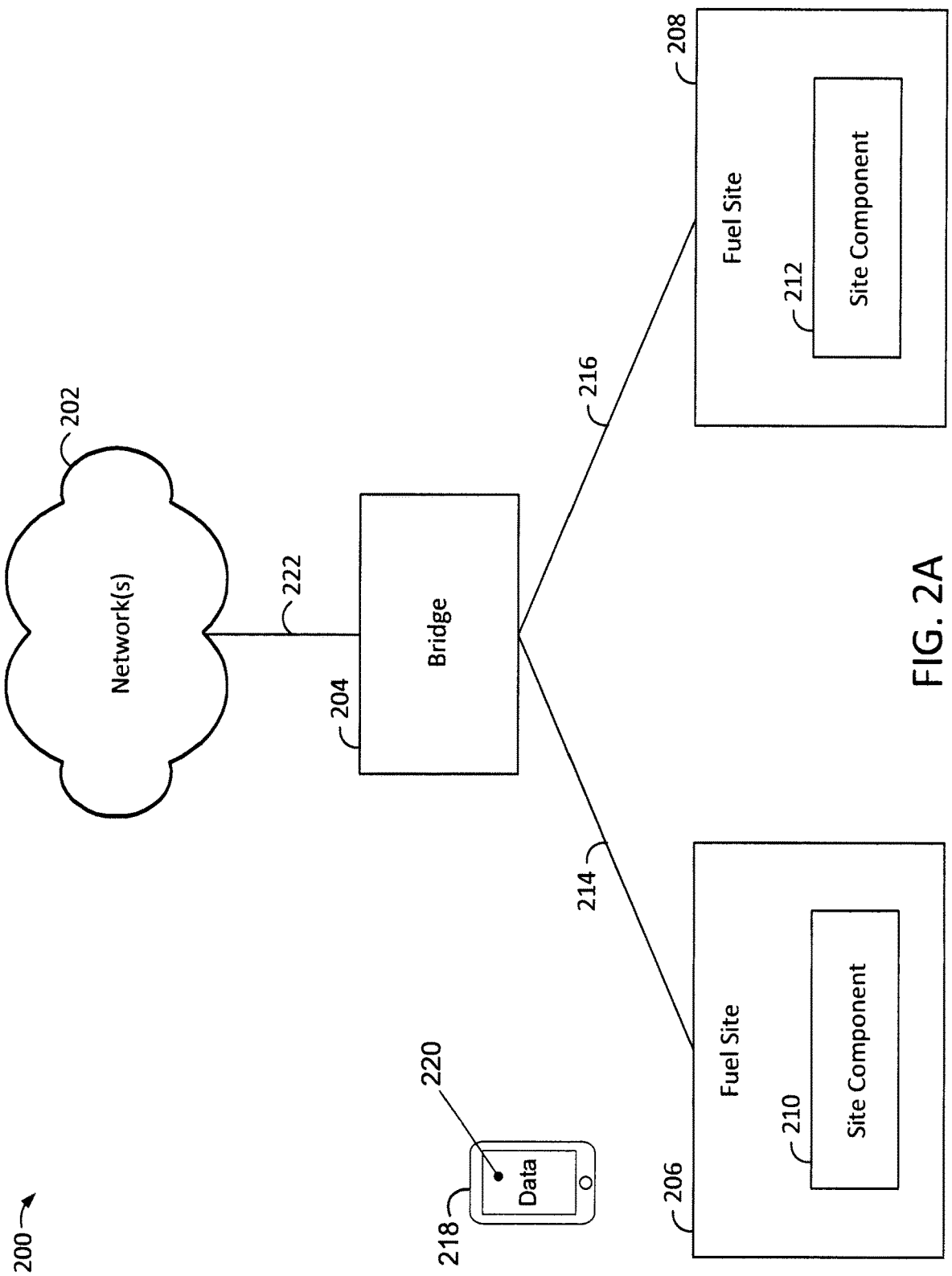
FIG. 2A is a block diagram of an exemplary system, according to an example.

FIG. 2A is a block diagram of an exemplary system 200, according to an example. The system 200 may include aspects the system 100 described above in relation to FIG. 1. For example, the one or more networks 202 may include the server 102 and/or the one or more networks 108 described above. In particular, the one or more networks 202 may take the form of a cloud-based network and/or platform to enable merchants and banks to deploy secure mobile wallets. As shown, the system 200 includes a bridge 204 and fuel sites 206 and 208. In some instances, the bridge 204 may transfer (e.g., send and/or receive) data over the one or more connections 214 and 216 to the site components 210 and 212 of the fuel sites 206 and 208, respectively. In some instances, the one or more connections 214 and 216 may include one transmission control protocol (TCP) connections and/or virtual private network (VPN) connections.

In some examples, the bridge 204 may be coupled with the one or more networks 202 via the connection 222, possibly to transfer data messages from the site components 210 and 212 to the one or more networks 202 and/or the server 102. As shown, the mobile device 218 may take the form of the client device 104 described above. Further, the mobile device 218 may be associated with the fuel site 206, possibly such that the mobile device 218 is located at the fuel site 206.

In some examples, the site component 210 may send messages over with the one or more connections 214. Further, the messages may indicate the fuel available at the fuel site 206. As such, the bridge 204 may transform the messages to identify, read, and/or process information associated with the fuel available at the fuel site 206. Further, the system 200 may communicate with the mobile device 218 over the one or more networks 202. In particular, the system 200 may transmit fuel data to the mobile device 218 over the one or more networks 202. As such, the user's mobile device 218 and/or the data 220 (e.g., display data and/or mobile application data) may display an indication of the fuel available at the fuel site 206.

Figure 2B:
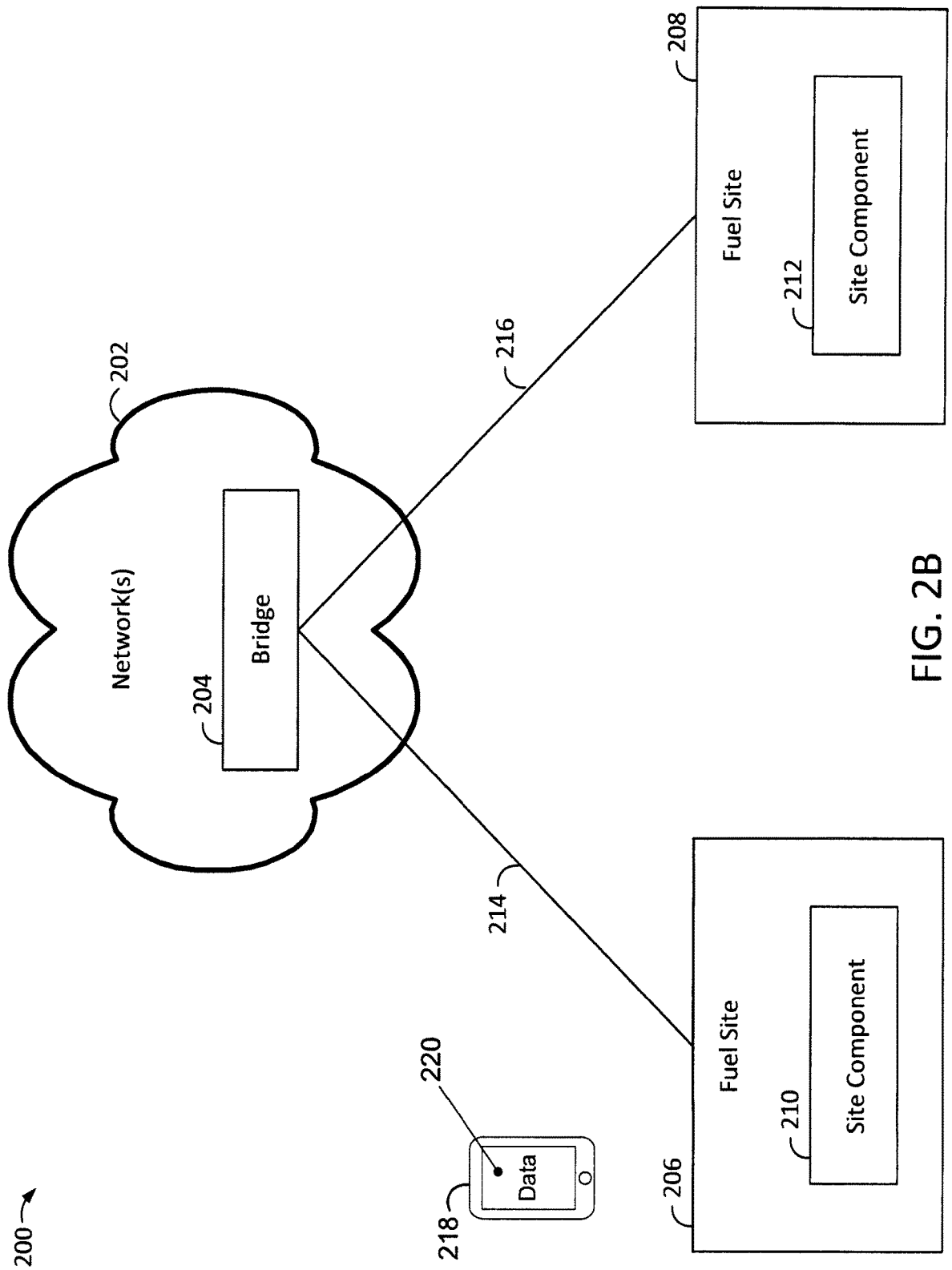
FIG. 2B is a block diagram of an exemplary system with a bridge included in one or more networks, according to an example.

FIG. 2B is a block diagram of an exemplary system 200 with the bridge 204 included in the one or more networks 202, according to an example. As shown, the system 200 may include the one or more networks 202, the bridge 204, and fuel sites 206 and 208 described above in relation to FIG. 2A. As noted, the bridge 204 may transfer data and/or messages over the one or more connections 214 and 216 to the site components 210 and 212 of the fuel sites 206 and 208, respectively.

As shown, the bridge 204 may be included with the one or more networks 202. As such, the one or more connections 214 and/or 216 may provide communication between the one or more networks 202 and the fuel sites 206 and 208. Further, the bridge 204 may transfer data messages from the site components 210 and 212 to the one or more networks 202 and/or the server 102 described above. As noted, the mobile device 218 may be associated with the fuel site 206, possibly such that the mobile device 218 is located at the fuel site 206.

Referring back to FIG. 1, the system 100 may include the non-transitory memory 114 and the one or more hardware processors 112 configured to cause the system 100 to perform operations. In some instances, the system 100 may determine the bridge 204 configured to communicate with the fuel sites 206 and/or 208. The system 100 may determine the mobile device 218, possibly identifying the mobile device 218 is associated the fuel site 206, as opposed to the other fuel sites, e.g., the fuel site 208. As noted, the fuel site 206 may include the site component 210. As such, the system 100 may determine one or more connections 214 of the bridge 204 with the site component 210 of the fuel site 206. Further, the system 100 may transmit fuel data to the mobile device 218 based on the one or more connections 214 of the bridge 204 with the site component 210 and/or messages received from the site component 210. As such, the mobile device 218 may display mobile application data 220, thereby providing the user with an indication of fuel available at the fuel site 206 based on the fuel data transmitted.

Figure 2C:
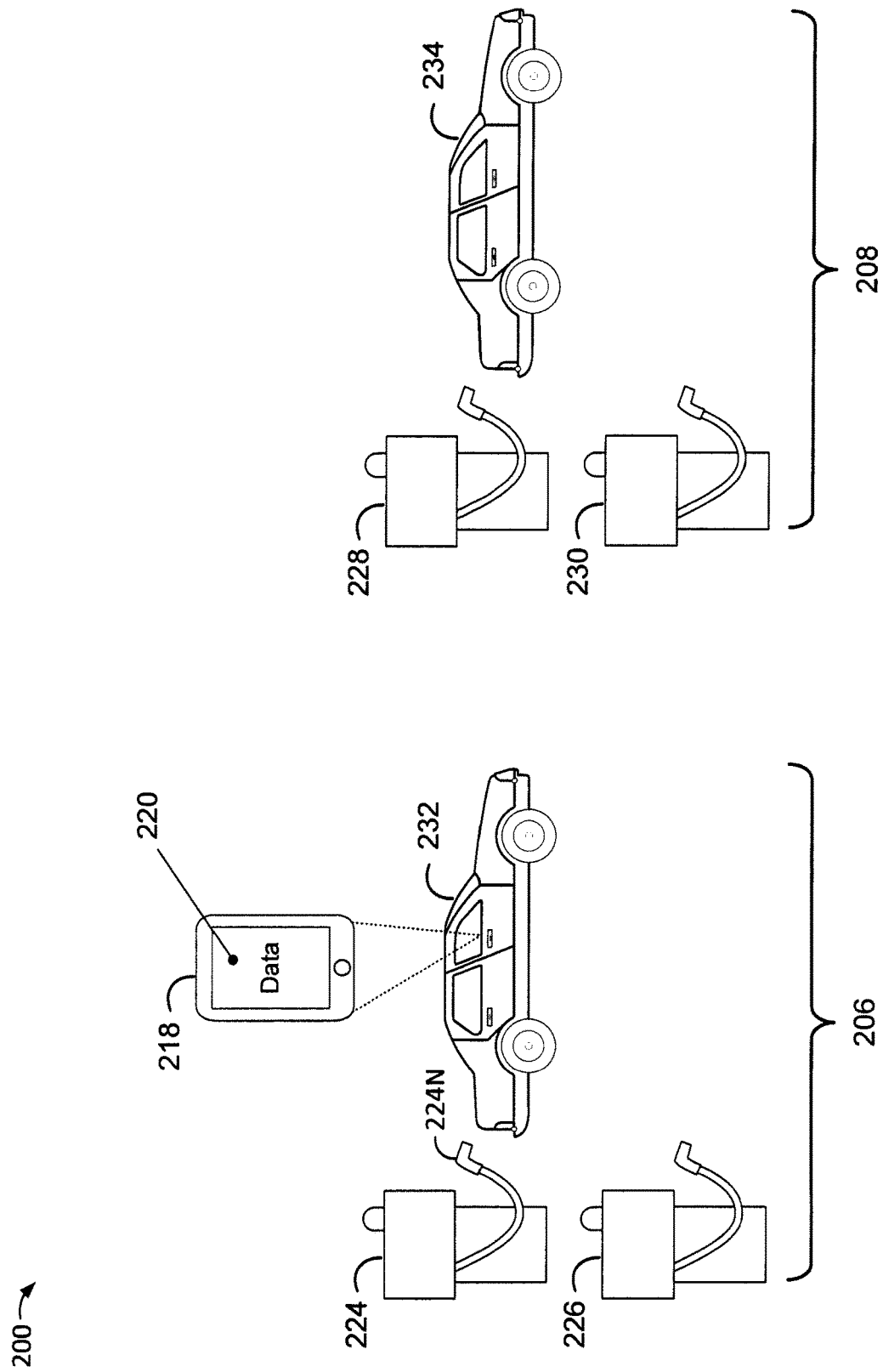
FIG. 2C illustrates an exemplary system with fuel pumps and vehicles, according to an example.

FIG. 2C illustrates the exemplary system 200 with fuel pumps 224 and 226, and vehicles 232 and 234, according to an example. As shown, the system 200 includes the mobile device 218 providing the data 220, possibly also referred to as mobile application data 220. Further, the system 200 may include the fuel sites 206 and 208 described above in relation to FIGS. 2A and 2B. As shown, the fuel site 206 includes fuel pumps 224 and 226. Further, the fuel site 208 includes the fuel pumps 228 and 230. Considering the scenarios described above, for example, the user may take her vehicle 232 to the fuel site 206 to refuel the vehicle 232 with the fuel pump 224.

In some examples, the system 200 may detect the vehicle 232 is located at the fuel site 206. For example, the mobile device 218 and/or the vehicle 232 may include one more global positioning system (GPS) components. As such, the system 200 may retrieve the GPS location of the mobile device 218 and/or the vehicle 232 from the one or more GPS components. As such, the system 200 may determine the mobile device 218 is associated with the fuel site 206. Further, the system 200 may determine a location of the mobile device 218 and/or the vehicle 232 corresponds to a location the fuel site 206, possibly such that the locations include the same or proximately close GPS coordinates. Notably, locations of the mobile device 218 and/or the vehicle 232 may be determined in a number of ways in addition to GPS coordinates (e.g., latitude and/or longitude coordinates. For example, the mobile device 218 may scan QR code associated with a given site, where the mobile device scans location data embedded in the QR code. Further, the mobile device 218 and/or the vehicle 232 may detect various wireless beacons, possibly associated with Blue Tooth Low Energy (BLE). As such, the locations of the mobile device 218 and/or the vehicle 232 may be determined in a number of ways, thereby providing additional context and/or data associated with the mobile device sending the context to the bridge 204 for the purposes of interacting with the appropriate sites 206 and/or 208.

In some examples, the system 200 may determine a location of the mobile device 218 corresponds to a location of the fuel pump 224, as opposed to the various locations of other fuel pumps 226, 228, and/or 230. Notably, the system 200 may determine the location of the mobile device 218 is in the vehicle 232 as opposed to the vehicle 234 at the fuel site 208. Further, the system 200 may determine the location of the mobile device 218 is proximate to the location of the fuel pump 224 such that the fuel pump 224 may be used to refuel the vehicle 232. In particular, the proximity may allow the fuel nozzle 224N to reach the vehicle 232 to refuel the vehicle 232. Notably, the location of the mobile device 218 may be determined to be proximate to the location of the fuel pump 224, as opposed to, for example, the fuel pump 226 that may also be located at the fuel site 206. As noted, the mobile device 218 and/or the vehicle 232 may include a GPS component such that the system 200 may determine the GPS location of the mobile device 218 and/or the vehicle 232 from the one or more GPS components.

In some examples, referring back to FIGS. 2A-2C, the system 200 may determine the bridge 204 configured to communicate with the fuel sites 206 and/or 208. The system 200 may determine the mobile device 218 is proximate to the fuel site 206. As noted, the fuel site 206 may include the site component 210 illustrated in FIGS. 2A and 2B. As such, the system 200 may determine one or more connections 214 of the bridge 204 with the site component 210 of the fuel site 206. Further, the system 100 may transmit fuel data to the mobile device 218 based on the one or more connections 214 of the bridge 204 with the site component 210. As such, the mobile device 218 may display the mobile application data 220 providing an indication of fuel available at the fuel site 206 based on the fuel data transmitted. In some instances, the indication of the fuel displayed by the mobile device 218 may include an indication of the fuel available with the fuel pump 224.

Figure 2D:
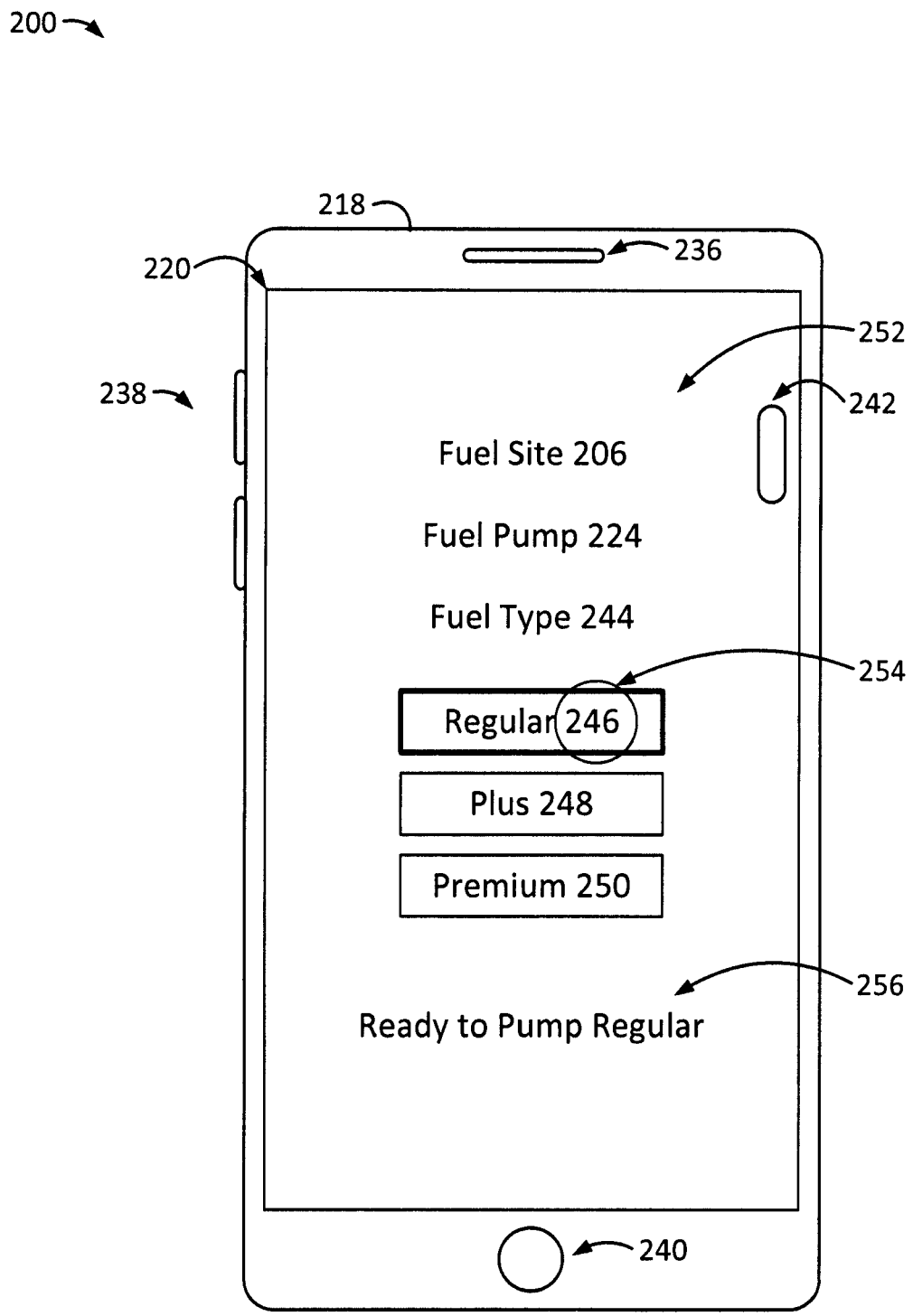
FIG. 2D illustrates the exemplary system with mobile application data, according to an example.

FIG. 2D illustrates the exemplary system 200 with the mobile application data 220, according to an example. As shown, the mobile device 218 may display the mobile application data 220. The mobile application data 220 may be associated with the fuel sites 206, 208, and/or other fuel sites. In some instances, the mobile application data 220 may be associated with one or more entities that operate and/or own the fuel sites 206, 208, and/or the other fuel sites contemplated above. Further, as shown, the mobile device 218 includes a speaker 236, one or more buttons 238, a button 240 including a fingerprint sensor, and a scroll bar 242 to control various views of the mobile application data 220.

As noted, the mobile device 218 may display the mobile application data 220 to provide the indication 252 of fuel available at the fuel site 206. As shown, the indication 252 may provide the fuel site 206 and/or the fuel pump 224, possibly such that the user can verify the correct fuel pump number is labeled or otherwise shown on the fuel pump 224. Further, the indication 252 may also provide a number of fuel types 244 available at the fuel site 206, such as regular fuel 246, plus fuel 248, and/or premium fuel 250, among other types of fuel. For example, the indication 252 may provide other types of fuel available, such as diesel fuel, ethanol, and/or various types of electrical charging options available for electric vehicles. Further, as shown, the regular fuel 246, the plus fuel 248, and/or the premium fuel 250 may be referred to as a regular fuel button 246, the plus fuel button 248, and/or the premium fuel button 250.

Notably, the mobile application data 220 may provide various types of other information as well. For example, the mobile application data 220 may provide the prices associated with each of the fuel types, including the regular fuel 246, the plus fuel 248, and/or the premium fuel 250, among other types of fuel contemplated above. Further, the mobile application data 220 may provide various car wash options, snack items, and/or other refreshment items, among other items available at the fuel site 206.

As shown, the system 200 may receive and/or detect a selection 254 of the fuel type 246, e.g., the regular fuel button 246, as opposed to the other fuel types 248 and 250 available at the fuel site 206. The system 200 may transmit instructions to the fuel site 206 that causes the fuel site 206 to provide the fuel type 246 selected. In particular, the system 200 may generate the instructions with the provider server 102 described above in relation to FIG. 1. Further, the system 200 may transmit the instructions from the one or more networks 202 to the bridge 204 as described above in relation to FIGS. 2A-2C. Yet further, the bridge 204 may transmit the instructions over the connection 214 to the site component 210 of the fuel site 206. In addition, the site component 210 may control the fuel pump 224 to provide the regular fuel 246 to refuel the user's vehicle 232.

As also shown in FIG. 2D, the indication 252 shows the fuel types 246, 248, and/or 250 available at the fuel site 206. Notably, the mobile application data 220 may also provide indications of fuel available at other sites, such as the fuel site 208. As shown, the indication 252 displayed by the mobile device 218 may include an indication 256 of the fuel type 246 selected and provided by the fuel pump 224. As shown, the indication 256 may provide a notification, "Ready to Pump Regular." Yet, the indication may include other notifications as well, such as "Now Pumping Regular Fuel," where the fuel nozzle 224N may be controlled and inserted into the vehicle 232 by a robotic arm of the fuel pump 224. As such, the user may be informed that the vehicle 232 is being pumped with regular fuel 246.

Figure 2E:
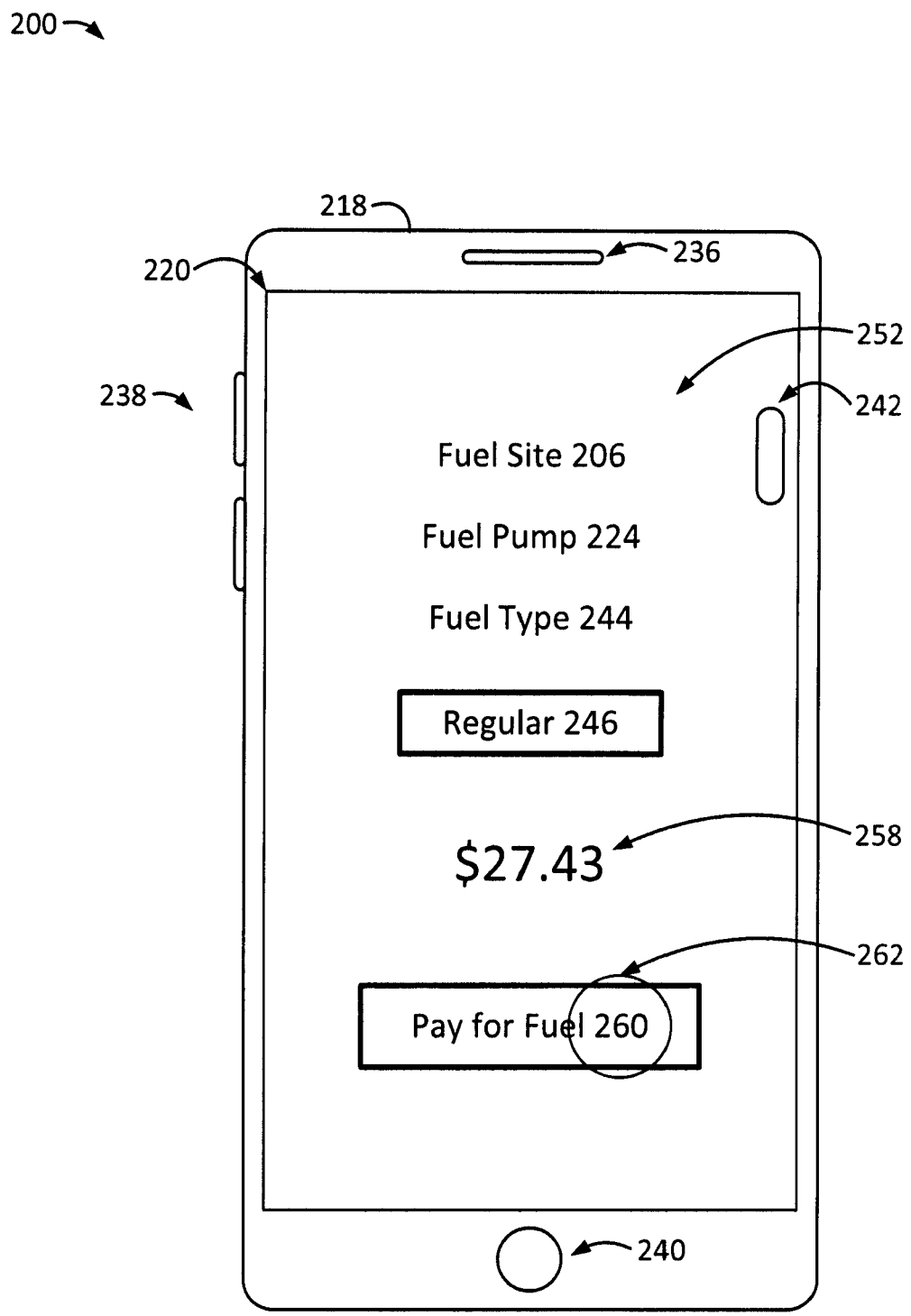
FIG. 2E illustrates the exemplary system with mobile application data, according to an example.

FIG. 2E illustrates the exemplary system 200 with the mobile application data 220 displayed, according to an example. As shown, the mobile device 218 may display the mobile application data 220 as described above in relation to FIG. 2D. Further, the indication 252 may include the fuel site 206, the fuel pump 224, the number of fuel types 244, and the fuel type 246 selected. Further, as shown, the mobile device 218 includes the speaker 236, the one or more buttons 238, the button 240 including the fingerprint sensor, and the scroll bar 242 to control various views of the mobile application data 220 described above.

In some examples, the system 200 may detect one or more times when the fuel pump 224 is pumping fuel and further, one or more times when the fuel pump 224 is not pumping fuel. For example, consider a scenario where the system 200 detects the fuel pump 224 is pumping fuel to the vehicle 232 and further detects that the fuel pump 224 is finished with pumping fuel to the vehicle 232, e.g., the fuel pump 224 is no longer pumping fuel because the fuel tank of the vehicle 232 is full. In such instances, the system 200 may determine an amount 258 spent based on the fuel type 246 provided and/or pumped to the vehicle 232. As shown, the amount 258 provides a notification, "$27.43," to indicate the amount spent on the regular fuel 246. Further, a button 260 may provide a notification, "Pay for Fuel." As such, a selection 262 of the button 260 may indicate to the system 200 that the user wishes to pay for the regular fuel 246 pumped.

In some examples, the system 200 may determine an account associated with the mobile device 218. As noted, the account may be a user account with funds that may be spent on fuel available at a number of the fuel sites 206 and/or 208. As such, considering the scenarios above, the system 200 may determine the user's account to deduct the amount 258 spent on the regular fuel 246 pumped. Further, the system 200 may cause the mobile application data 220 to display the amount 258 deducted from the user's account associated with the mobile device 218. In some instances, the user may place a finger on the button 240 including the fingerprint sensor. As such, the fingerprint data received by the sensor may be used to authenticate the deduction of the amount 258 from the user's account.

Figure 3A:
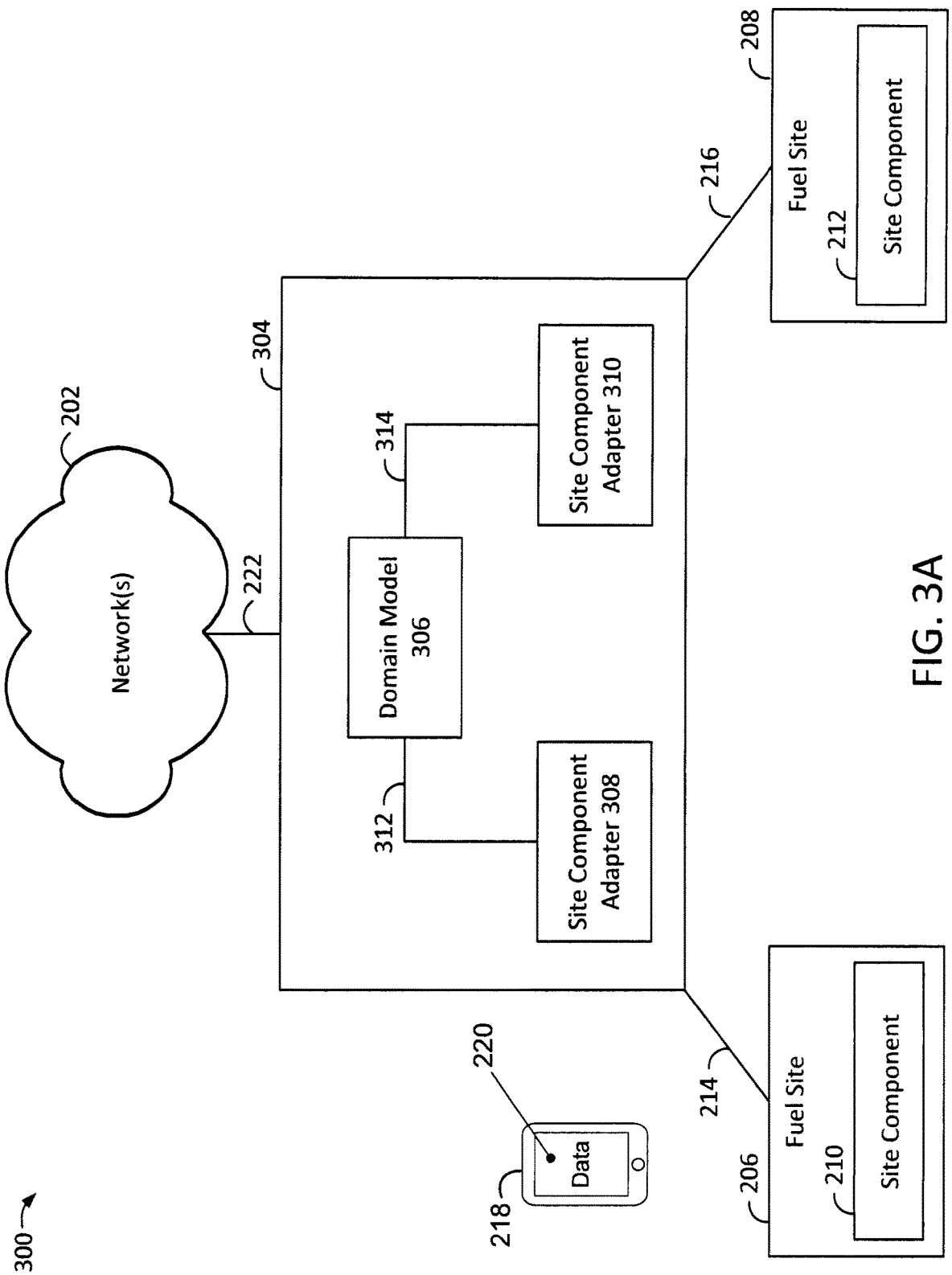
FIG. 3A is a block diagram of an exemplary system, according to an example.

FIG. 3A is a block diagram of an exemplary system 300, according to an example. The system 300 may include aspects of the system 100 and/or 200 described above in relation to FIGS. 1-2E. For example, the system 300 may include the server 102, the one or more networks 202, the mobile device 218 associated with the mobile application data 220. Further, the system 300 may include the fuel sites 206 and 208 and the site components 210 and 212, respectively. Further, as shown, the system 300 includes a bridge 304 that may take the form of the bridge 204 described above. For example, the bridge 304 may be coupled with the one or more networks 202 with the connection 222. Further, the bridge 304 may transfer (e.g., send and/or receive) messages and/or instructions over the one or more connections 214 and 216 to the site components 210 and 212, respectively. Notably, the bridge 304 may be included in the one or more networks 202 as shown, for example, with the bridge 204 included in the one or more networks 202 described above in relation to FIG. 2B.

Various data structures may be used for the bridge 204 to track operations and events corresponding to different tenants. In the present example, the tenants include multiple customers that access the bridge 204. In the present example, the bridge 204 assigns a unique identifier to each tenant, as shown below, to avoid collisions between data corresponding to the different tenants. As shown below, the unique identifier may include a string that is a composite of a tenant name, merchant identifier, and an external store location. Each of these values may be separated by a delimiter, such as a "–" symbol or other delimiter, as shown below.

TABLE 1

Multi-Tenancy Data Structure.

| Tenant | Merchant Identifier | External Store Location Identifier | Unique Identifier |
|---|---|---|---|
| Customer A | ABC | 7777 | A-ABC-1-7777 |
| Customer B | ABC | 8888 | B-ABC-2-8888 |

Further, as shown, the bridge 304 includes a domain model 306, a site component adapter 308, and a site component adapter 310. Yet further, the adapter 308 may be configured with the site component 210 and the adapter 310 may be configured with the site component 212. In addition, a connection 312 is provided between the adapter 308 and the domain model 306. Further, a connection 314 is provided between the adapter 310 and the domain model 306. As described above, the site components 210 and 212 may send messages over the one or more connections 214 and 216 to the adapters 308 and 310, possibly indicating the fuel available at the fuel sites 206 and 208, respectively. In such instances, the domain model 306 may receive the messages from the connections 312 and/or 314. Further, the domain model 306 may transform the messages to identify, read, and/or process the information associated with the fuel available at the fuel sites 206 and 208. In particular, the domain model 306 may apply various domain rules and/or processes associated with the message transformations, possibly establishing a central decision-making component of the bridge 304 for executing the instructions described herein.

In the present example, the adapters 308 and 310 provide connections between the various components. Once a connection has been established, a communications adapter may keep the connection open until it is either terminated by a site component (e.g., site component 210 and/or 212) or by the adapter itself. In some examples, connections are terminated when a site component is disconnected and/or when a communications module is disconnected due to failed validations. In some examples, metadata for the connections are held in a local cache (e.g., cache 348, as is described in further detail below). The local cache may include a mapping data structure (such as a JAVA map) that includes the metadata such as a connection identifier, external store location identifier, date/time stamp, the type of connection object, and so forth.

TABLE 2

Mapping Data Structure.

| Connection Identifier | External Store Location Identifier | Date Time Stamp | Connection Object |
|---|---|---|---|
| 1 | 123 | 2015-09-02 10:13:09 AM | Netty connection object |

In more detail regarding a connection object, a connection object may include an object that is accessed to manage a connection. For example, with respect to a Transmission Control Protocol (TCP)/Internet Protocol (IP) connection, a connection object may include various fields that are used to manage the connection, such as source and destination Internet Protocol (IP) addresses, source and destination media access control (MAC) addresses, packet header information, and/or other information used to manage the connection.

In some examples, the domain model 306 may communicate the fuel information over the one or more networks 202 such that the mobile device 218 may receive the fuel data that corresponds to the fuel available at the fuel sites 206 and 208. As such, the mobile device 218 may display the mobile application data 220 including the fuel types 244 available, such as the regular fuel 246, the plus fuel 248, and/or the premium fuel 250, among other types of fuel described above.

Figure 3B:
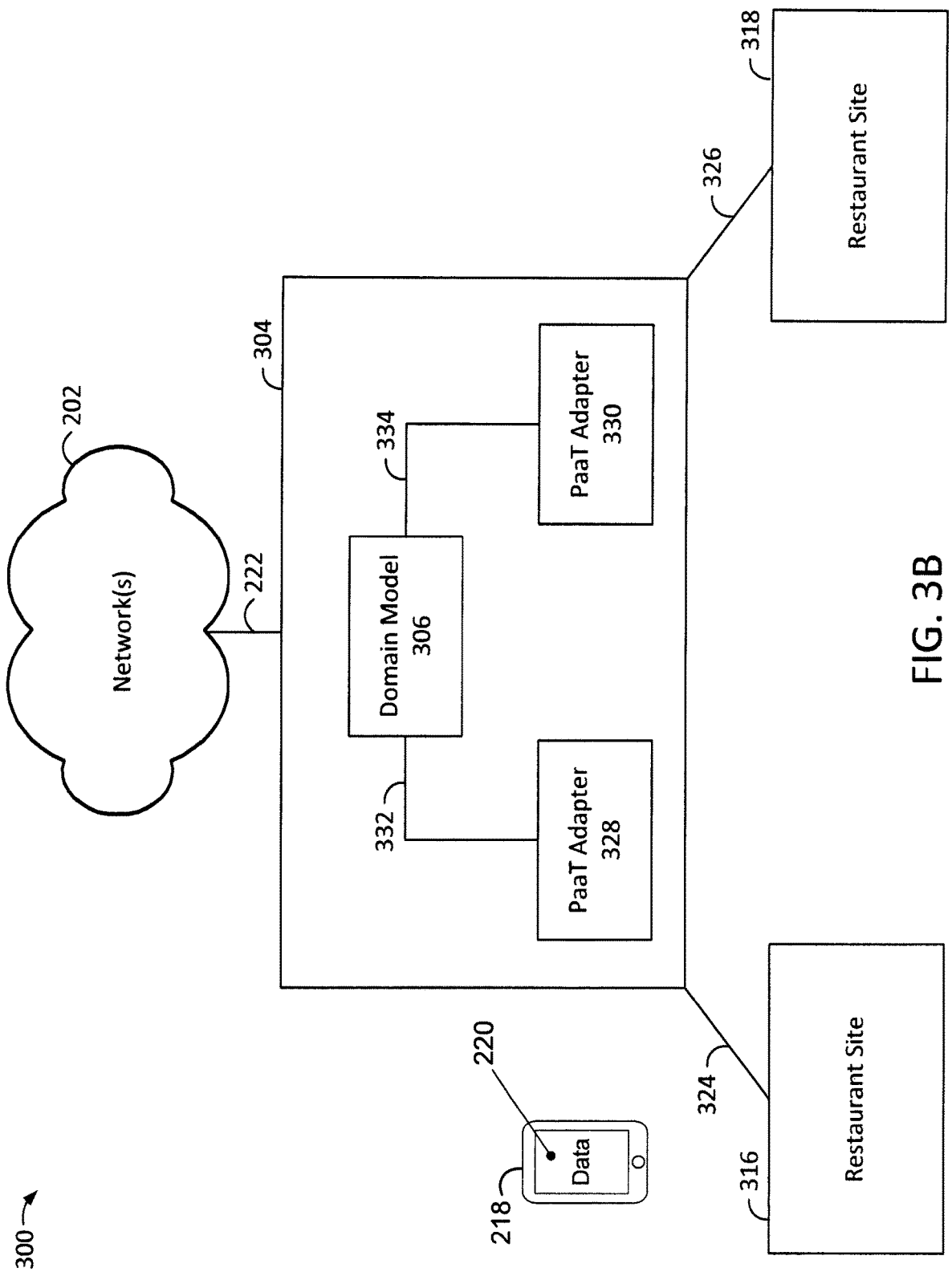
FIG. 3B is a block diagram of an exemplary system with restaurant sites, according to an example

FIG. 3B is a block diagram of an exemplary system 300 with restaurant sites 316 and 318, according to an example. As shown, the system 300 may include the one or more networks 202, the connection 222, the bridge 304, and the domain model 306 described above in relation to FIG. 3A. As noted, the bridge 304 may be included in the one or more networks 202. Yet further, as shown, the system 300 may include the restaurant sites 316 and 318. Further, the bridge 304 may transfer (e.g., send and/or receive) messages and/or instructions over the one or more connections 324 and 326 to the restaurant sites 316 and 318, respectively. Notably, the bridge 304 may be included in the one or more networks 202 as shown, for example, with the bridge 204 included in the one or more networks 202 described above in relation to FIG. 2B.

Further, as shown, the bridge 304 includes a pay-at-a-table (PaaT) adapter 328 and a PaaT adapter 330. Further, the adapter 328 may be configured with the restaurant site 316 and the adapter 330 may be configured with the restaurant site 318. Further, a connection 332 is provided between the adapter 328 and the domain model 306. In addition, a connection 334 is provided between the adapter 330 and the domain model 306. The restaurant sites 316 and 318 may send messages over the one or more connections 324 and 326 to the adapters 328 and 330, possibly indicating the food and/or drink items available at the restaurant sites 316 and 318, respectively. In such instances, the domain model 306 may receive the messages from the connections 332 and/or 334. Further, the domain model 306 may transform the messages to identify, read, and/or process the information associated with the food and/or drink available at the restaurant sites 316 and/or 318. In particular, the domain model 306 may apply various domain rules and/or processes associated with the message transformations, possibly establishing a central decision-making component of the bridge 304 for executing the instructions described herein.

Yet further, as shown, the mobile device 218 may take the form of the client device described above in relation to FIGS. 1-2E. Further, the mobile device 218 may be associated with the restaurant site 316, possibly such that the mobile device 218 is located at the restaurant site 316. For example, considering the scenarios above, a user may be sitting at a table at the restaurant site 316 while carrying the mobile device 218. In some examples, the domain model 306 may communicate the restaurant information over the one or more networks 202 such that the mobile device 218 may receive the restaurant data that corresponds to the food and/or drink items available at the restaurant sites 316 and 318. As such, the mobile device 218 may display mobile application data 220 indicating the various food and/or drink items available at the restaurant sites 316 and 318.

Figure 3C:
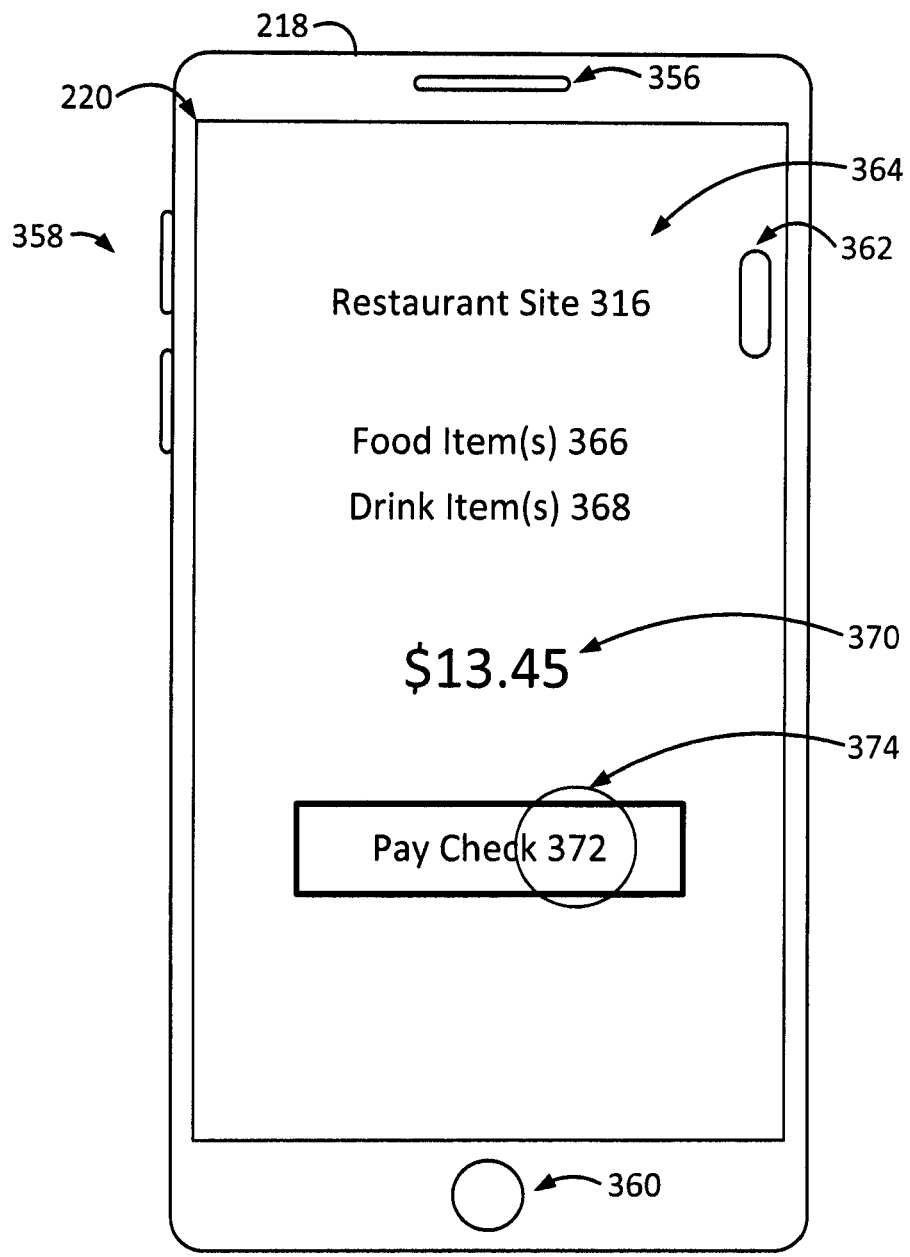
FIG. 3C illustrates the exemplary system with mobile application data, according to an example.

FIG. 3C illustrates the exemplary system 300 with the mobile application data 220, according to an example. As shown, the mobile device 218 may display the mobile application data 220. The mobile application data 220 may be associated with the restaurant sites 316, 318, and/or other restaurant sites, possibly including cafes, bistros, eateries, and/or diners. In some instances, the mobile application data 220 may be associated with one or more entities that operate and/or own the restaurant sites 316, 318, and/or the other restaurant sites contemplated above. Further, as shown, the mobile device 218 includes a speaker 356, one or more buttons 358, a button 360 including a fingerprint sensor, and a scroll bar 362 to control various views of the mobile application data 220. In particular the components 356-362 may take the form of the components 236-242 described above in relation to FIGS. 2D and 2E.

In some examples, the mobile device 218 may display the mobile application data 220 to provide the indication 364. As shown, the indication 364 may provide the restaurant site 316, one or more food items 366 ordered, and one or more drink items 368 ordered, possibly such that the user can verify the correct items ordered and/or served.

In some examples, the system 300 may detect when the user is ready to pay for the one or more food items 366 and drink items 368 ordered. For example, consider a scenario where the system 200 detects the selection 374 of the button 372 that provides the notification, "Pay Check." In such instances, the system 300 may determine an amount 370 spent based on the one or more food items 366 and drink items 368 ordered. As shown, the amount 370 provides a notification, "$13.45," to indicate the amount spent on the one or more food items 366 and drink items 368 ordered. Yet further, in some instances, the amount 370 may also request the user to provide a tip associated with the amount 370. In particular, the user may be able to select an option to specify the amount of the tip with the number pad of the mobile device 218. As such, the selection 374 of the button 372 may indicate to the system 300 that the user wishes to pay for the one or more food items 366 and drink items 368 ordered.

In some examples, the system 300 may determine an account associated with the mobile device 218. As noted, the account may be a user account with funds that may be spent on items available at a number of the restaurant sites 316 and/or 318. As such, considering the scenarios above, the system 300 may determine the account to deduct the amount 370 spent on the one or more food items 366 and drink items 368 ordered. Further, the system 300 may cause the mobile application data 220 to display the amount 370 deducted from the account associated with the mobile device 218. In some instances, the user may place a finger on the button 360 including the fingerprint sensor. As such, the fingerprint data received by the sensor may be used to authenticate the deduction of the amount 258.

Figure 3D:
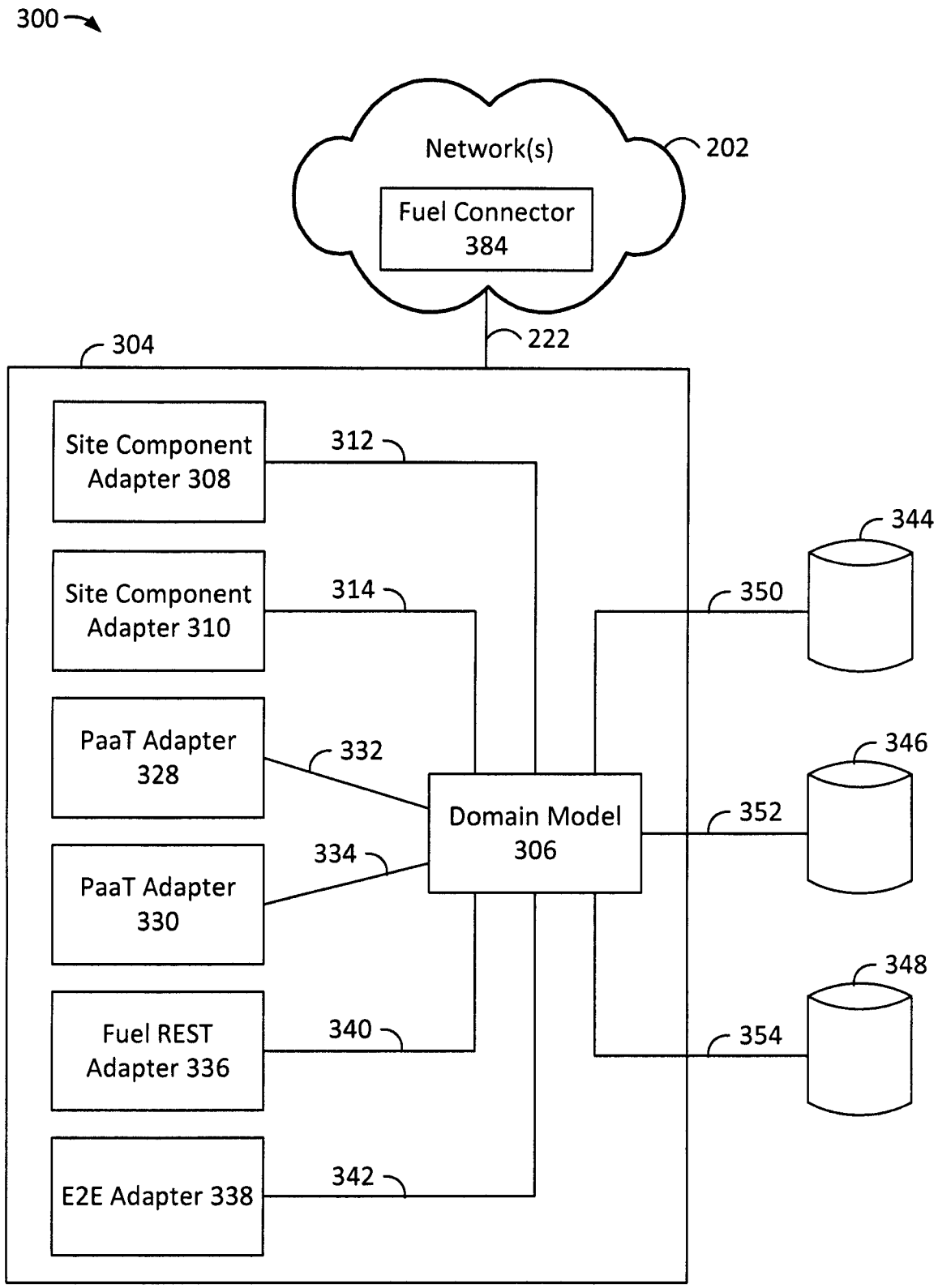
FIG. 3D is a block diagram of an exemplary system with a number of adapters, according to an example.

FIG. 3D is a block diagram of the exemplary system 300 with a number of adapters 308, 310, 328, 330, 336, and 338, according to an example. As shown, the system 300 may include the one or more networks 202, the connection 222, and the bridge 304, described above in relation to FIGS. 3A-3C. Further, the bridge 304 may include the domain model 306, the site component adapters 308 and 310, the PaaT adapters 328 and 330, and the respective connections 312, 314, 332, and/or 334 described above. In addition, the bridge 304 may include a fuel representational state transfer (REST) adapter 336 with the connection 340 to the domain model 306 and also the entity-to-entity (E2E) adapter 338 with the connection 342 to the domain model 306. In particular, the fuel REST adapter 336 may interface with one or more fuel connectors 384 of the one or more networks 202. Further, the E2E adapter may interface with one or more E2E gateways of the one or more networks 202.

Yet further, as shown, the bridge 304 may include the connection 350 from the domain model 306 to the advanced messaging queuing protocol (AMQP) storage 344. In addition, the bridge 304 may include the connection 352 from the domain model 306 to the database 346. Further, the bridge 304 may include the connection 354 from the domain model 306 to the cache 348.

In some examples, a non-transitory machine-readable medium of domain model 306 may have stored thereon machine-readable instructions executable to cause a machine, such as the system 300, to perform operations. For example, the system 300 may determine the bridge 304 including a number of the adapters 308, 310, 328, 330, 336, and 338. As noted, the adapters 308 and 310 may correspond to the fuel sites 206 and 208, respectively. Further, the adapters 328 and 330 may correspond to the restaurant sites 316 and 318, respectively. As such, the system 300 may determine the mobile device 218 associated with the fuel site 206 from a number of other fuel sites including the fuel site 208. As noted, the fuel site 206 may include the site component 210. Yet further, the system 300 may transform one or more messages from the site component adapter 308 received from the site component 210. In addition, the system 300 may transmit fuel data to the mobile device 218 based on the one or more transformed messages. As such, the mobile device 218 may display the indication 252 of fuel types 246, 248, and/or 250 available at the fuel site 206 based on the fuel data transmitted. In some examples, the system 300 may cause the domain model 306 to determine one or more connections 214 of the bridge 304 with the site component 210. As such, the indication 252 of the fuel types 246, 248, and/or 250 may be displayed by the mobile device 218 based on the one or more connections 214 of the bridge 304 with the site component 210.

In some examples, the number of adapters 308, 310, 328, 330, 336, and 338 includes the PaaT adapter 328 associated with the restaurant site 316 and/or configured for the restaurant site 316. As such, the system 300 may determine a second mobile device, such as the mobile device 218 associated with the restaurant site 316. The system 300 may transform one or more restaurant messages from the PaaT adapter 328, where the restaurant messages may be received from the restaurant site 316. Further, the system 300 may transmit restaurant data to the mobile device 218 based on the one or more restaurant messages transformed. As such, the mobile device 218 displays the indication 364 of food and/or drink items available at the restaurant site 316 based on the restaurant data transmitted.

Figure 3E:
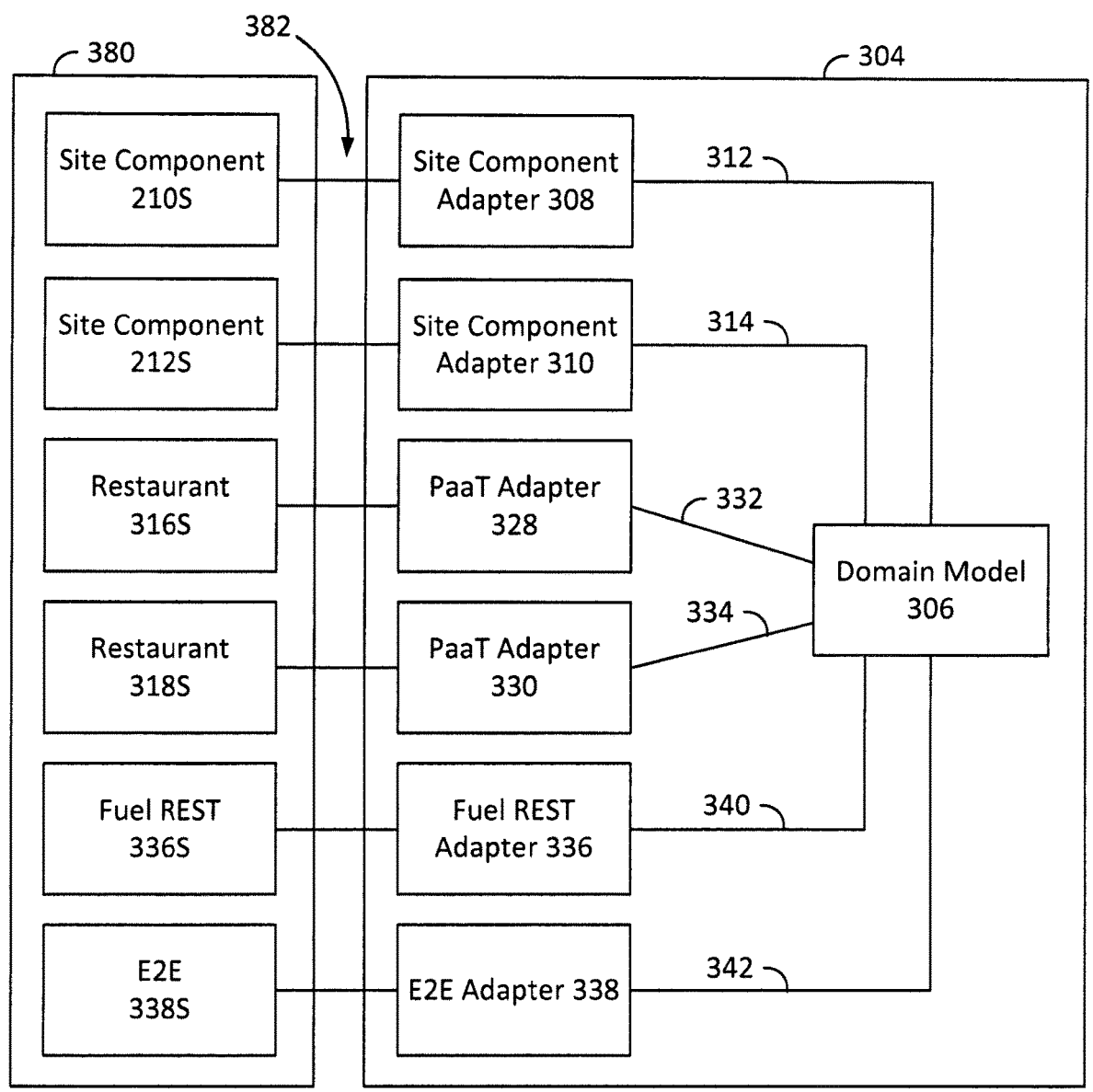
FIG. 3E is a block diagram of the exemplary system 300 with a simulator, according to an example.

FIG. 3E is a block diagram of the exemplary system 300 with a simulator 380, according to an example. As shown, the system 300 may include the bridge 304, described above in relation to FIGS. 3A-3D. Further, the bridge 304 may include the domain model 306, the site component adapters 308 and 310, the PaaT adapters 328 and 330, and the respective connections 312, 314, 332, and/or 334 described above. In addition, the bridge 304 may include the fuel REST adapter 336 with the connection 340 to the domain model 306 and also the entity-to-entity (E2E) adapter 338 with the connection 342 to the domain model 306.

In addition, as shown, the system 300 may include the simulator 380. In some instances, the simulator 380 may include the site component simulators 210S and 212S that simulate the site components 210 and 212, respectively. Further, the simulator 380 may include the restaurant simulators 316S and 318S that simulate the restaurants 316 and 318, respectively. Yet further, the simulator 380 may include the fuel REST simulator 336S and the E2E simulator 338S that simulate the fuel connector 384 and the E2E gateway of the one or more networks 202. As shown, a number of respective connections 382 may be established between the simulators 210S, 212S, 316S, 318S, 336S, and 338S, and the corresponding adapters 308, 310, 328, 330, 336, and 338.

In some examples, the site component simulators 210S and 212S may generate messages that are typically generated by the site components 210 and 212 at the fuel sites 206 and 208. Further, the site component simulators 210S and 212S may transfer (e.g., send and/or receive) such messages with the adapters 308 and 310, thereby mimicking and/or simulating the site components 210 and 212 on the fuel sites 206 and 208. In some instances, the fuel sites 206 and 208 may be legacy fuel sites with a limited number of site components 210 and 212. As such, the simulators 210S and 212S may allow the bridge 304 to be designed, tested, and/or verified without occupying the site components 210 and 212, thereby minimizing down time at the fuel sites 206 and 208.

Further, the restaurant simulators 316S and 318S may generate messages that are typically generated by the restaurant sites 316 and 318. Further, the restaurant simulators 316S and 318S may transfer (e.g., send and/or receive) such messages with the adapters 328 and 330, thereby mimicking and/or simulating the restaurant sites 316 and 318. In some instances, the restaurant sites 316 and 318 may be legacy restaurant sites with a limited availability and/or bandwidth. As such, the simulators 316S and 318S may allow the bridge 304 to be designed, tested, and/or verified without occupying the restaurant sites 316 and 318, thereby minimizing down time at the restaurant sites 316 and 318.

Further, the fuel REST simulator 336S and the E2E simulator 338S may generate messages that are typically generated by the fuel connector 384 and the E2E gateway of the network 202, respectively. Further, the simulators 336S and 338S may transfer (e.g., send and/or receive) such messages with the adapters 336 and 338, thereby mimicking and/or simulating the fuel connector 384 and the E2E gateway. In some instances, the one or more networks 202 may be legacy networks with limited availability, bandwidth, and/or opportunities for downtime. As such, the simulators 336S and 338S may allow the bridge 304 to be designed, tested, and/or verified without occupying the one or more networks 202, thereby minimizing down time of the one or more networks 202.

As noted, the systems 100, 200, and/or 300 may minimize implementation challenges. In particular, the simulator 380 allows various adapters 308, 310, 328, 330, 336, and/or 338 to be designed, tested, and/or verified, while also minimizing down time at the sites 206, 208, 316, and 318, and the one or more networks 202.

Figure 4:
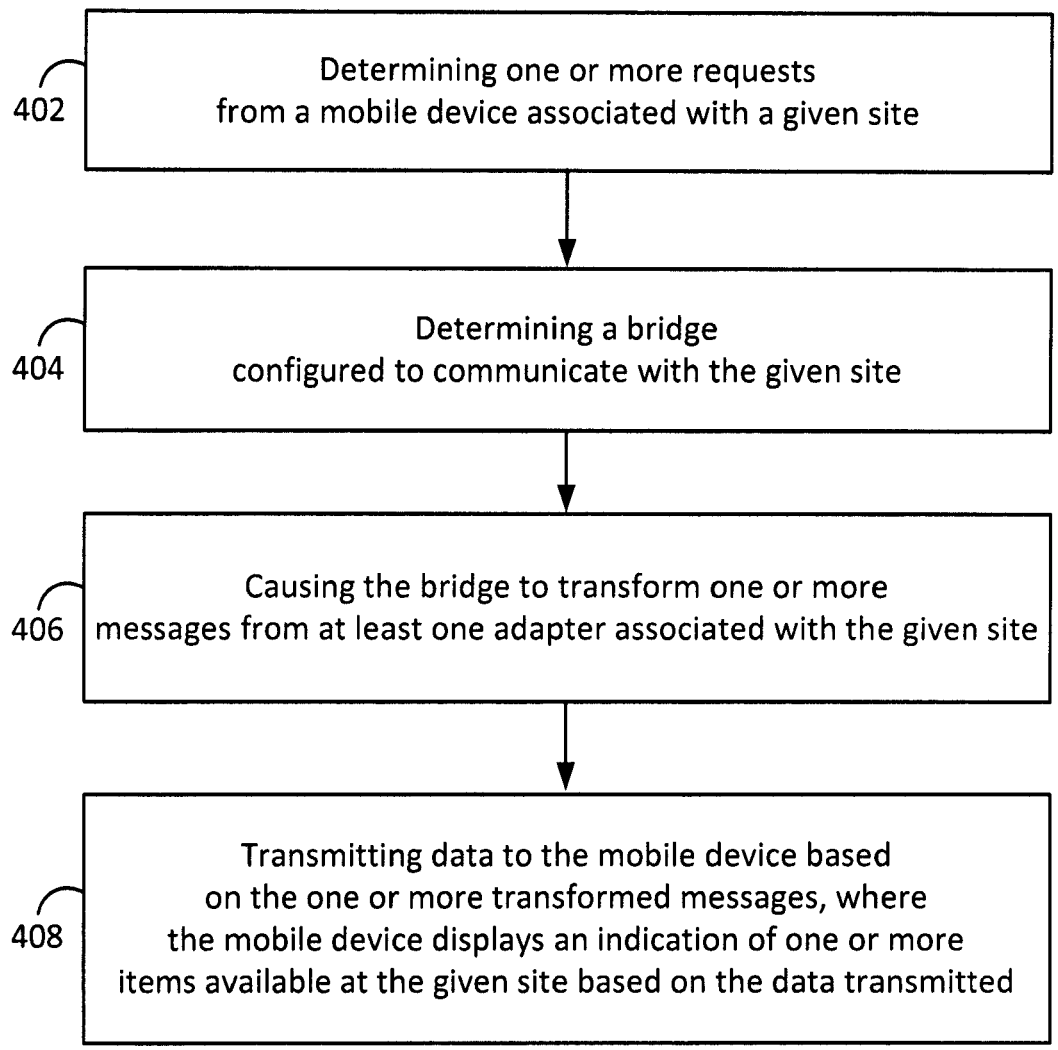
FIG. 4 illustrates an exemplary method, according to an example.

FIG. 4 illustrates an exemplary method 400, according to an example. Notably, one or more steps of the method 400 described herein may be omitted, performed in a different sequence, and/or combined with other methods for various types of applications contemplated herein. In some instances, the domain model 306 of the bridge 304 described above in relation to FIGS. 3A-3E may perform one or more steps of the method 400.

At step 402, the method 400 may include determining one or more requests from a mobile device associated with a given site. For example, referring back to FIGS. 3A-3E, the system 300 may determine one or more requests from the mobile device 218 for the types of fuel 246, 248, and/or 250 available at the fuel site 206. Yet further, the system 300 may determine one or more requests from the mobile device 218 to pay for the one or more food items 366 and/or the one or more drink items 368 ordered at the restaurant site 316.

At step 404, the method 400 may include determining a bridge configured to communicate with the given site. For example, as described above, the system 300 may determine the bridge 304 configured to communicate with the fuel site 206 and/or the restaurant site 316. Yet, as noted, the system 300 may determine the bridge 304 is configured to communicate with other sites as well, such as the fuel site 208 and/or the restaurant site 318. In addition, the system 300 may determine the bridge 304 is configured to communicate with retail sites, such as brick-and-mortar stores.

At step 406, the method 400 may include causing the bridge to transform one or more messages from at least one adapter associated with the given site. For example, the system 300 may cause the domain model 306 to transform the one or more messages from the site component adapter 308 configured with the site component 210, where the one or more fuel messages may be received from the site component 210. Further, the domain model 306 may transform the one or more restaurant messages from the PaaT adapter 328 configured with the restaurant site 316, where the one or more restaurant messages may be received from the restaurant 316.

At step 408, the method 400 may include transmitting data to the mobile device based on the one or more transformed messages, where the mobile device displays an indication of one or more items available at the given site based on the data transmitted. For example, the system 300 may transmit fuel data to the mobile device 218 based on the one or more messages transformed by the domain model 306. As such, the mobile device 218 may display mobile application data 220 including the indication 252 described above. Further, the system 300 may transmit restaurant data to the mobile device 218 based on the one or more messages transformed by the domain model 306. As such, the mobile device 218 may display mobile application data 220 including the indication 364 described above.

As noted, in some instances, the one or more requests from the mobile device 218 may be associated with the restaurant site 316, where the restaurant site 316 provides the one or more items 366 and/or 368 available. In some examples, the method 400 includes determining an estimated wait time at the restaurant site 316 based on the one or more transformed messages. Further, the system 300 may generate the restaurant data based on the estimated wait time at the restaurant site 316. As such, data may be transmitted to the mobile device 218 such that the mobile device 218 further displays the mobile application data 220 with the estimated wait time.

In some examples, the method 400 may include determining a location of the mobile device 218 corresponds to a particular location at the restaurant site 316. For example, consider the restaurant site 316 includes a bar location, a dining location, and/or a take-out location. Further, in some instances, the restaurant site 316 may include a food court with a number of varying restaurant locations. As such, the restaurant data transmitted to the mobile device 218 may be based on the location of the mobile device that corresponds to the particular location at the restaurant site 316. As such, the indication 364 displayed by the mobile device 218 may include the one or more items 366 and/or 368 available at the particular location at the restaurant site 316.

In some examples, the method 400 may include receiving a selection of at least one item 366 and/or 368 from the one or more items displayed by the mobile device 218. Further, the method 400 may include transmitting instructions to the restaurant site 316 that causes the restaurant site to provide and/or serve the items 366 and/or 368 selected. As such, the indication 364 displayed may include an indication of the items 366 and/or 368 provided and/or served.

In some examples, the mobile device 218 may include the mobile application data 220 associated with the restaurant site 316. As such, the method 400 may include determining an amount 370 spent based on the item 366 and/or 368 provided and/or served. As such, the method 400 may include determining an account associated with the mobile device 218 to deduct the amount 370 spent. As such, the mobile application data 220 may display the amount 370 deducted from the account associated with the mobile device 218.

Figure 5:
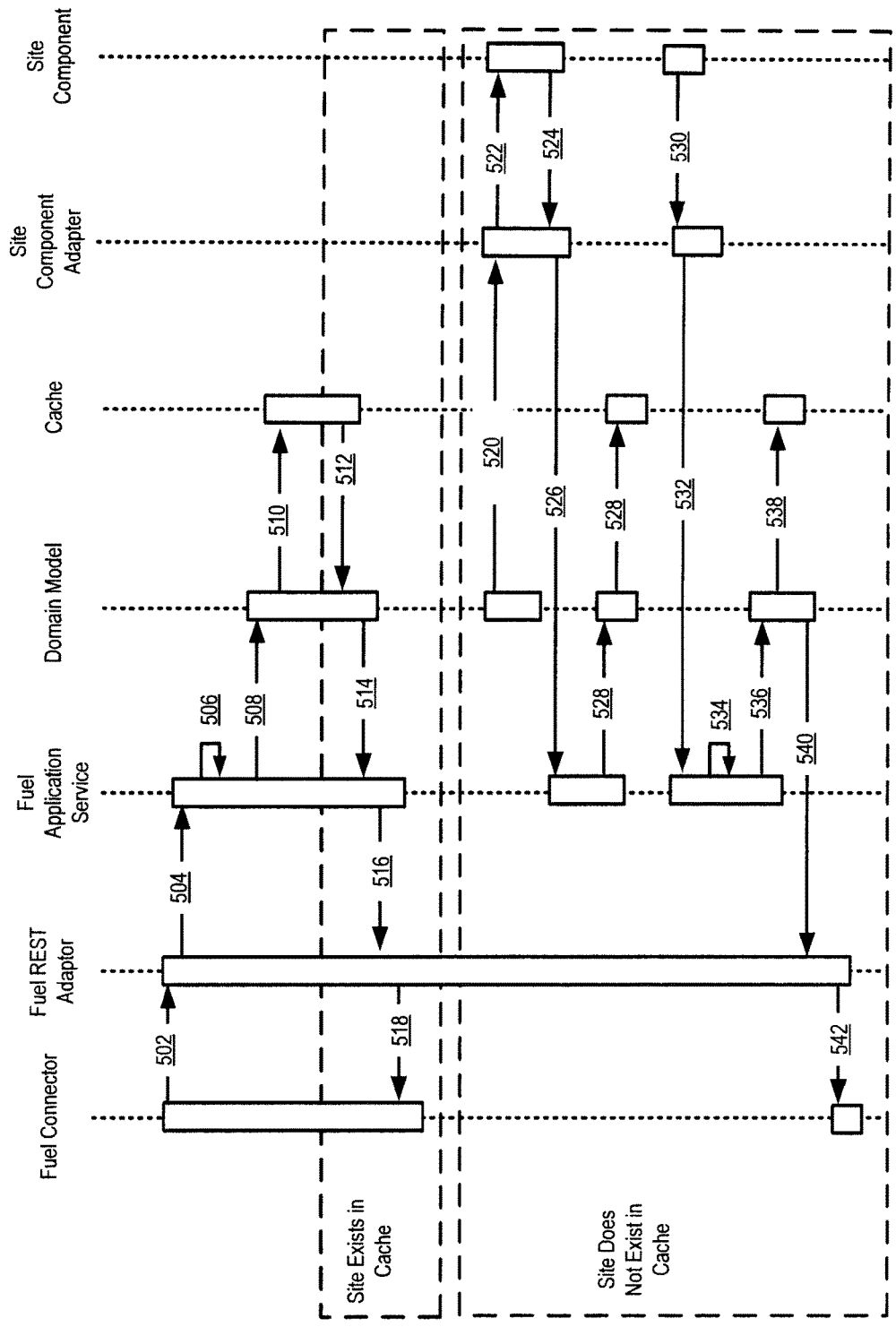
FIG. 5 illustrates an exemplary method of retrieving site information, according to an example.

FIG. 5 illustrates an exemplary method 500 for retrieving site information, according to an example. Notably, one or more steps of the method 500 described herein may be omitted, performed in a different sequence, and/or combined with other methods for various types of applications contemplated herein. In some instances, the components described above in relation to FIGS. 3A-3E may perform one or more steps of the method 500.

At step 502, the fuel connector (e.g., fuel connector 384) sends a GET request to a fuel REST adaptor (e.g., fuel REST adapter 336). The GET request may include one or more site identifiers corresponding to the fuel site(s) (e.g., fuel site 206 and/or fuel site 208) that are targeted by the GET request. The information requested may include one or more of the tenant, merchant identifier, external store location identifier, and/or unique identifier, which are described in more detail with respect to Table 1 (above).

At step 504, the fuel REST adapter receives the request and sends a request to a fuel application service to obtain a DTO including the site information. In the present example, the fuel application service provides access to fuel use cases of the bridge and is a direct client of the domain model. Examples of the fuel application service's responsibilities include delegating domain processing, initiating and owning transactions, accessing infrastructure components, such as repositories, and handling security and/or logging. At step 506, the fuel application service provides a persist function to temporarily store the request and track the request. At step 508, the fuel application service sends a request to the domain model (e.g., domain model 306). At step 510, the domain model requests the site information from its cache. In some examples, this step is performed by querying a database or other data store.

If the domain model is able to locate the information from the cache, the site information is retrieved at step 512, and the DTO that includes the site information is transferred from the domain model to the fuel application service in step 514, to the fuel REST adapter in step 516, and to the fuel connector in step 518.

At step 520, if the domain model was unable to locate the site information in the cache, the domain model sends the request to the site component adapter (e.g., site component adapter 308 or 310), which then in step 522 sends the request to the site component (e.g., site component 210 or 212). At step 524, the site component acknowledges the request from the site component adapter, which then in step 526 sends a report of the fuel site's response to the fuel application service. The fuel application service at step 528 sends the fuel site's response to the domain model, which updates a message state in the cache regarding the fuel site's response in step 528.

At step 530, the fuel site provides the site information to the site component adapter. This information may be formatted in an XML or other markup format. At step 532, the site component adapter sends the site information to the fuel application service, which persists the site information at step 534, and provides the site information to the domain model in step 536, which caches the site information in step 538.

In step 540, the domain model provides the DTO that includes the site information to the fuel REST adapter in step 540, and to the fuel connector in step 542.

Figure 6:
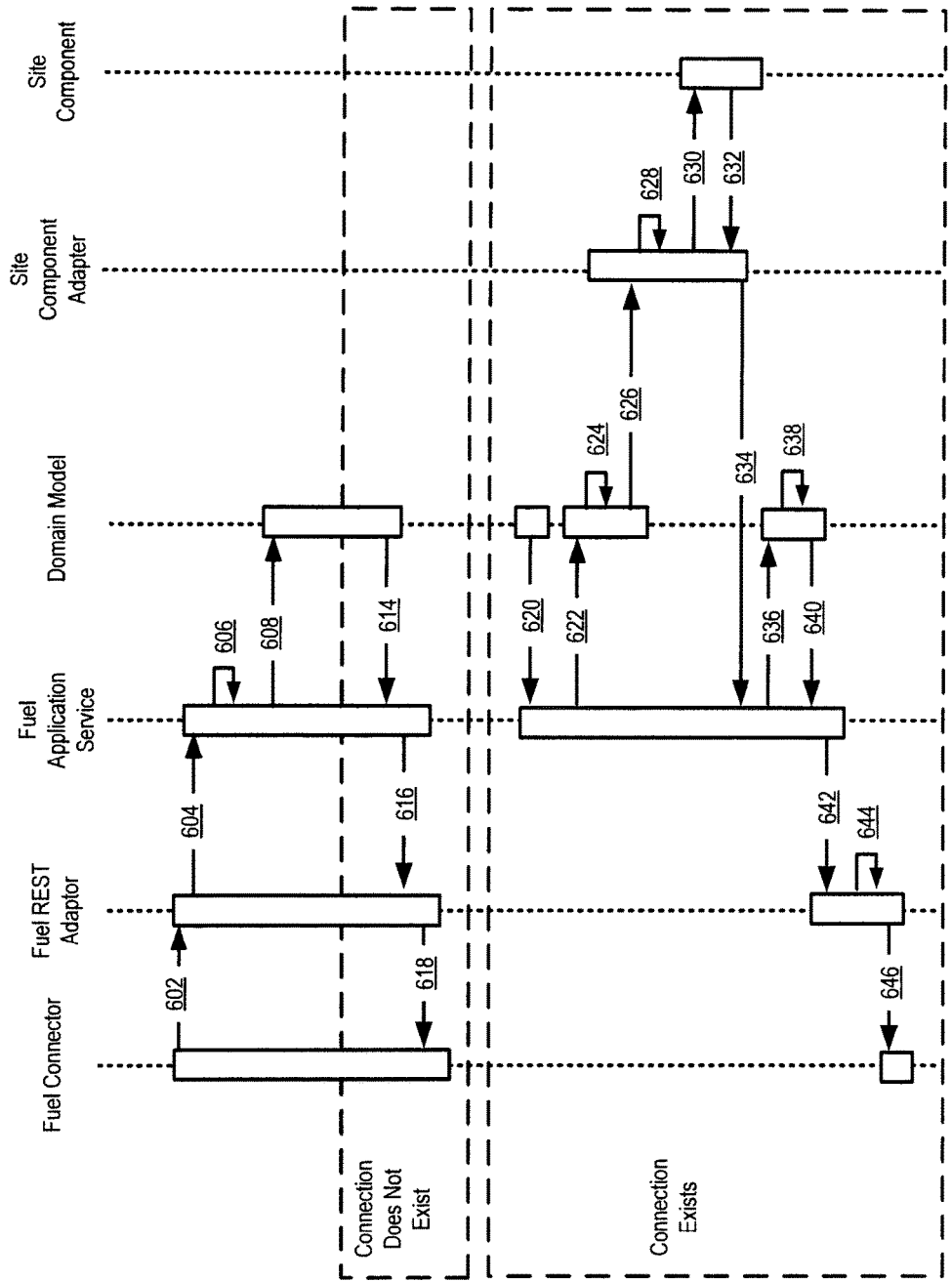
FIG. 6 illustrates an exemplary method of authorizing a fuel transaction, according to an example.

FIG. 6 illustrates an exemplary method 600 for retrieving site information, according to an example. Notably, one or more steps of the method 600 described herein may be omitted, performed in a different sequence, and/or combined with other methods for various types of applications contemplated herein. In some instances, the components described above in relation to FIGS. 3A-3E may perform one or more steps of the method 600.

At step 602, the fuel connector sends a request including a site identifier to the fuel request adaptor. At step 604, the fuel REST adaptor sends an authorization request to the fuel application service, which persists the request in step 606 and requests a connection from the domain model at step 608. If no connection exists, in step 614 the domain model sends a response to the requests to the fuel application service indicating that no connections exist. The fuel application service sends this response to the fuel REST adapter in step 616, which sends the response to the fuel connector in step 618.

If the domain model determines that a connection exists, the domain model sends an indication to the fuel application service at step 620, indicating that a connection exists. At step 622, the fuel application service requests authorization from the domain model to authorize fuel pumping. The domain model processes the request in step 624 and sends an authorization DTO to the site component adapter in step 626. The site component adapter processes the DTO in step 628 and sends an authorization to the site component in step 630, which provides a response to the authorization to the site component adapter in step 632. In step 634, the site component adapter sends an authorization request DTO to the fuel application service, which provides the DTO to the domain model in step 636. In step 638, the Domain Model processes the pump authorization and at step 640 provides the result of the processing to the fuel application service in step 540. In step 642 the fuel application service sends the result to the fuel REST adapter, which then processes the result in step 644, and sends the result to the fuel connector in step 646.

Figure 7:
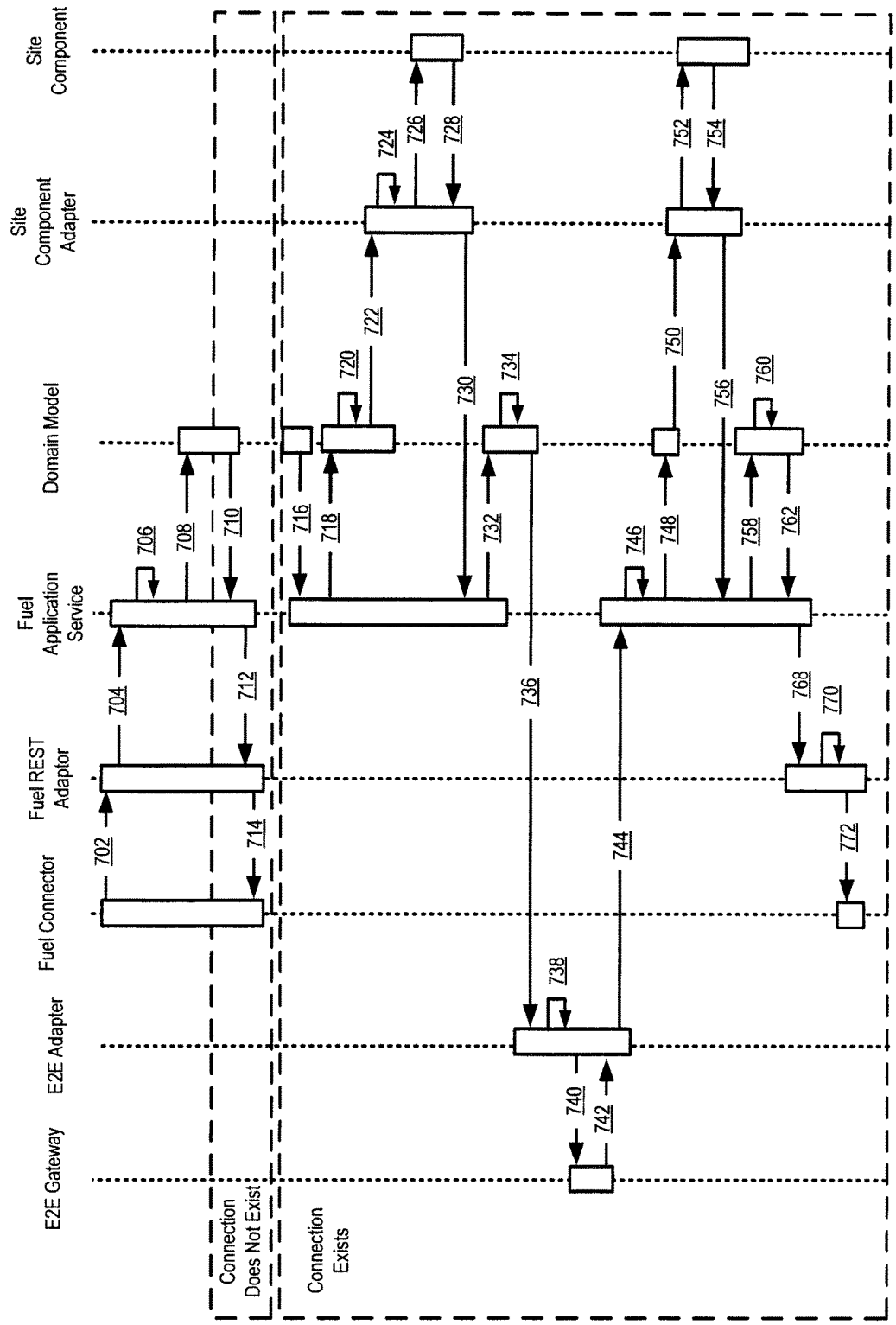
FIG. 7 illustrates an exemplary method of authorizing a fuel transaction including a code entry, according to an example.

FIG. 7 illustrates an exemplary method 700 for retrieving site information, according to an example. Notably, one or more steps of the method 700 described herein may be omitted, performed in a different sequence, and/or combined with other methods for various types of applications contemplated herein. In some instances, the components described above in relation to FIGS. 3A-3E may perform one or more steps of the method 700.

At step 702, the fuel connector sends a request including the site identifier to the fuel REST adapter. At step 704, the fuel REST adapter sends the request to the fuel application service, which persists in request in step 706, and requests a connection from the domain model in step 708. In step 710, if the domain model determines that no connection exists, the domain model indicates to the fuel application service that no connection exists, which sends the indication to the fuel REST adapter in step 712 and to the fuel connector in step 714.

At step 716, if the domain model determines that there is a connection available, the domain model indicates to the fuel application service that a connection exists, which sends an authorize pump command to the domain model at step 718. At step 720, the domain model processes the command to authorize the pump and at step 722 sends an authorize pump DTO to the site component adapter, which processes the DTO in step 724 and sends an authorization request to the site component in step 726.

In step 728, the site component sends a validation request to the site component adapter. At step 730, the site component adapter sends the request to the fuel application service, which then sends a request code validation request to the domain model in step 732. The domain model processes the request in step 734 and sends the request including a DTO to the E2E adapter (e.g., E2E adapter 338) in step 736. In step 738, the E2E adapter processes the DTO and validates the code entry with the E2E gateway in step 740. At step 742, the E2E gateway sends a validation result to the E2E adapter, which sends a validation result DTO to the fuel application service in step 744. The fuel application service persists the validation result in step 746 and sends the validation result to the domain model in step 748. The domain model sends a validation result DTO to the site component adapter in step 750, which then provides the site component a validation response in step 752. The site component responds to the authorization in step 754. In step 756, the site component adapter provides a DTO corresponding to the authorization response to the fuel application service In step 758, the DTO is provided to the domain model, which processes the pump authorization in step 760 and sends a pump authorization DTO to the fuel application service in step 762, which in step 768 is then provided to the fuel REST adapter. The fuel REST adapter processes the DTO in step 770 and sends the DTO to the fuel connector in step 772.

Figure 8:
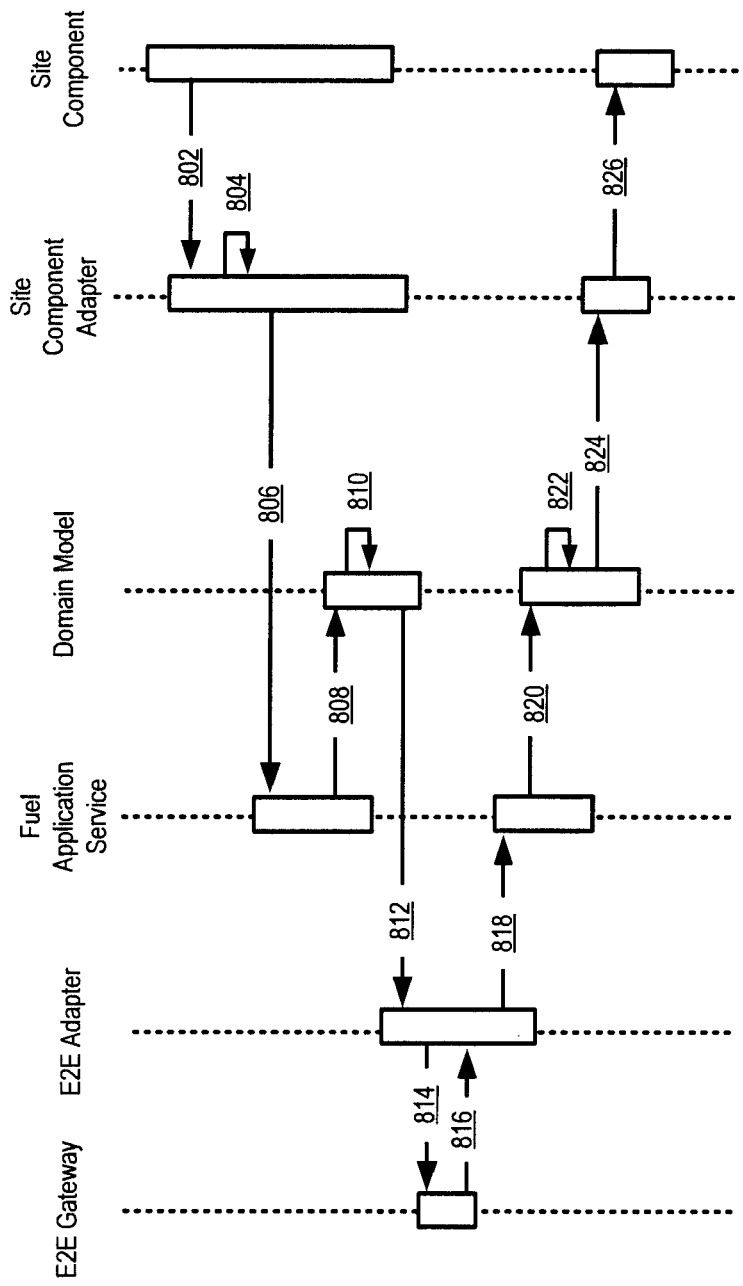
FIG. 8 illustrates an exemplary method of updating fuel events, according to an example.

FIG. 8 illustrates an exemplary method 800 for retrieving site information, according to an example. Notably, one or more steps of the method 800 described herein may be omitted, performed in a different sequence, and/or combined with other methods for various types of applications contemplated herein. In some instances, the components described above in relation to FIGS. 3A-3E may perform one or more steps of the method 800.

At step 802, the site component sends a begin fueling request to the site component adapter. At step 804, the site component adapter processes the request, and at step 806 sends a process fuel event message to the fuel application service. At step 808, the fuel application service sends a process fuel event to the domain model, which persists the even at step 810, and at step 812 sends a process fuel event message to the E2E adapter.

At step 814, the E2E adapter provides a site event DTO to the E2E gateway, which responds in step 816 with an update fuel event response. In step 818, the E2E adapter provides the response to the fuel application service, which in step 820 sends the response to the domain model. At step 822, the domain model persists the response and at step 824 sends the response to the site component adapter. At step 826, the site component adapter sends a begin fueling response to the site component.

The present disclosure, the accompanying figures, and the claims are not intended to limit the present disclosure to the precise forms or particular fields of use disclosed. As such, it is contemplated that various alternate examples and/or modifications to the present disclosure, whether explicitly described or implied herein, are possible in light of the disclosure. Having thus described examples of the present disclosure, persons of ordinary skill in the art will recognize that changes may be made in form and detail without departing from the scope of the present disclosure.

The invention claimed is:

1. A system, comprising:
a bridge;
a non-transitory memory; and
one or more hardware processors coupled to the non-transitory memory and configured to read instructions from the non-transitory memory to cause the system to perform operations comprising:
detecting a mobile device at a location associated with a fuel site comprising a site component;
selecting, from a plurality of adapters configured to communicate with a plurality of fuel sites, a particular adapter for communicating with the site component of the fuel site based on a component type of the site component;
configuring the bridge of the system to communicate with the fuel site based on the particular adapter, wherein the bridge enables one or more connections between the system and the site component of the fuel site;
determining a domain model configured to transform one or more messages from a first data format associated with the site component to fuel data in a second data format readable by the mobile device over a network;
determining that a fuel information data transfer object (DTO) obtained from the site component of the fuel site is stored in a data cache associated with the server;
retrieving the fuel information DTO from the data cache;
determining the fuel data associated with the fuel site from the fuel information DTO;
detecting that a user has initiated a computing action via a mobile application on the mobile device that indicates that the user will utilize the fuel site;
transforming, using the domain model, the fuel data from the first data format to the second data format;
transmitting the fuel data in the second data format to the mobile device via the network, wherein the transmitting the fuel data causes an indication of fuel available at the fuel site to be displayed on the mobile device;
receiving a selection of a fuel type from the mobile device based on the fuel data;
transforming the selection for the fuel type to an authorization DTO in the first data format for the site component using the domain model;
transmitting the authorization DTO to the site component via the bridge that causes the site component to initiate a fueling response with a fuel pump;
causing, through the bridge, the fuel pump to begin pumping fuel corresponding to the fuel type into a vehicle;
detecting, through the bridge, that the fuel pump has stopped pumping the fuel into the vehicle;
in response to the detecting that the fuel pump has stopped pumping the fuel into the vehicle, (i) calculating a payment amount based on the fuel type and an amount of the fuel that has been pumped into the vehicle by the fuel pump, and (ii) causing the mobile device to present the payment amount and a selectable element for initiating a payment transaction; and
in response to receiving a selection of the selectable element, processing the payment transaction.

2. The system of claim 1, wherein the one or more connections comprises one or more of a transmission control protocol (TCP) connection or a virtual private network (VPN) connection.

3. The system of claim 1, wherein the operations further comprise:
communicating with the mobile device over the network, wherein the mobile device is detected based at least on communicating with the mobile device.

4. The system of claim 1, wherein the system comprises the bridge configured to communicate with the plurality of fuel sites including the fuel site, and wherein the one or more connections provides communication between the system and the plurality of fuel sites.

5. The system of claim 1, wherein the operations further comprise:
generating, using the domain model, the authorization DTO in the first data format.

6. The system of claim 1, wherein the operations further comprise:
maintaining, via the particular adapter, an open connection of the one or more connections between the bridge and the site component, wherein the maintaining of the open connection includes caching a mapping data structure that stores a connection identifier, location identifier, time stamp, and an indicator corresponding to a connection object, and wherein the connection object stores source and destination network address information corresponding to the bridge and the site component.

7. The system of claim 1, wherein the fuel site comprises a plurality of fuel pumps, wherein the detecting the mobile device at the location comprises determining that the location corresponds to the fuel pump from the plurality of fuel pumps, and wherein the indication of the fuel displayed on the mobile device comprises a plurality of fuel types available for the fuel pump.

8. The system of claim 1, wherein the indication of fuel available at the fuel site comprises an indication of a plurality of fuel types available at the fuel site.

9. The system of claim 8, wherein the processing the payment transaction comprises:
determining an account associated with the mobile device; and
deducting the payment amount from the account.

10. A non-transitory machine-readable medium having stored thereon machine-readable instructions executable to cause a machine to perform operations comprising:
detecting that a mobile device is at a location associated with a restaurant site comprising a site component;
selecting, from a plurality of adapters configured to communicate with a plurality of restaurant sites, a particular adapter for communicating with the site component of the restaurant site based on a component type of the site component;
configuring a bridge to communicate with the restaurant site based on the particular adapter;

retrieving, using the bridge configured based on the particular adapter, restaurant data from the site component through one or more connections between the bridge and the site component, wherein the restaurant data is in a first data format associated with the site component;

detecting that a user has initiated a computing action via a mobile application on the mobile device that indicates an intent to visit the restaurant site;

transforming the restaurant data from the first data format to a second data format readable by the mobile device;

transmitting, based on the detecting that the user has initiated a computing action, the transformed restaurant data to the mobile device that causes an indication of items available at the restaurant site to be displayed on the mobile device;

receiving a selection from the mobile device based on the restaurant data, wherein the selection indicates one or more items or services associated with the restaurant site;

transforming the selection in the second data format to an authorization data transfer object (DTO) in the first data format for the site component of the restaurant site; and transmitting the authorization DTO to the site component via the bridge configured based on the particular adapter and the one or more connections, wherein the transmitting the authorization DTO to the site component causes a payment transaction associated with the one or more items or services to be processed.

11. The non-transitory machine-readable medium of claim 10, wherein the operations further comprise:
establishing, using the bridge, the one or more connections with the site component; and
generating the indication of items to be displayed on the mobile device based at least on the one or more connections.

12. The non-transitory machine-readable medium of claim 10, wherein the plurality of adapters comprises at least one pay-at-a-table (PaaT) adapter associated with the restaurant site, wherein the operations further comprise:
maintaining, via the particular adapter, an open connection of the one or more connections between the bridge and the site component, wherein the maintaining of the open connection includes caching a mapping data structure that stores a connection identifier, location identifier, time stamp, and an indicator corresponding to a connection object, and wherein the connection object stores source and destination network address information corresponding to the bridge and the site component.

13. The non-transitory machine-readable medium of claim 10, wherein the plurality of adapters comprise a plurality of Pay-at-a-Table (PaaT) adapters, a fuel representational state transfer (REST) adapter, and an entity-to-entity (E2E) adapter.

14. The non-transitory machine-readable medium of claim 13, wherein the operations further comprise obtaining an identity of the restaurant site based on communicating with an advanced messaging queuing protocol (AMQP) storage, a database, or a data cache.

15. A method, comprising:
determining, by a computer server, one or more requests from a mobile device associated with a site;
selecting, by the computer server and from a plurality of adapters configured to communicate with a plurality of sites, a particular adapter for communicating with a site component of the site;
configuring, by the computer server, a bridge associated with the computer server to communicate with the site via the particular adapter, wherein the bridge enables one or more connections between the computer server and the site component of the site;
transforming, by the computer server using a domain model of the bridge, one or more messages from a first data format associated with the site component to a second data format accessible by the mobile device;
transmitting, based on detecting that the user has initiated a computing action, the transformed one or more messages to the mobile device;
receiving a user input from the mobile device based on the transformed one or more messages, wherein the user input indicates one or more items or services for purchase;
transforming the user input to an authorization data transfer object (DTO) in the first data format for the site;
transmitting the authorization DTO to the site via the bridge and the one or more connections, wherein the transmitting causes the site to provide the one or more items or services;
in response to detecting that the one or more items and services have been fulfilled, (i) calculating a payment amount based on the one or more items or services, and (ii) causing the mobile device to present the payment amount and a selectable element for initiating a payment transaction; and
in response to receiving a selection of the selectable element, processing the payment transaction.

16. The method of claim 15, wherein the site comprises a restaurant site, and wherein the restaurant site provides the one or more items or services.

17. The method of claim 16, further comprising:
determining an estimated wait time at the restaurant site based at least on the one or more messages; and
causing the estimated wait time to be displayed on the mobile device.

18. The method of claim 15, further comprising:
determining a location of the mobile device corresponds to a first location of the site, wherein the transformed one or more messages are transmitted to the mobile device based further on the location of the mobile device, and wherein the indication displayed by the mobile device comprises the one or more items or services available at the first location of the site.

19. The method of claim 15, wherein the selecting the particular adapter is based on a component type associated with the site component of the site.

20. The method of claim 15, wherein the processing the payment transaction comprises:
determining an account associated with the mobile device; and
deducting the payment amount from the account.

* * * * *